(12) United States Patent
Yamamoto et al.

(10) Patent No.: US 9,475,242 B2
(45) Date of Patent: Oct. 25, 2016

(54) EYEGLASS LENS PROCESSING APPARATUS

(71) Applicant: NIDEK CO., LTD., Gamagori, Aichi (JP)

(72) Inventors: Tadamasa Yamamoto, Gamagori (JP); Motoshi Tanaka, Gamagori (JP); Hirokatsu Obayashi, Toyokawa (JP)

(73) Assignee: NIDEK CO., LTD., Aichi (JP)

( * ) Notice: Subject to any disclaimer, the term of this patent is extended or adjusted under 35 U.S.C. 154(b) by 240 days.

(21) Appl. No.: 14/228,740

(22) Filed: Mar. 28, 2014

(65) Prior Publication Data
US 2014/0297016 A1    Oct. 2, 2014

(30) Foreign Application Priority Data

Mar. 29, 2013 (JP) ................................. 2013-074333

(51) Int. Cl.
*A61B 3/10* (2006.01)
*A61B 3/14* (2006.01)
*B29D 11/00* (2006.01)

(52) U.S. Cl.
CPC ... *B29D 11/00961* (2013.01); *B29D 11/00932* (2013.01)

(58) Field of Classification Search
USPC .................................................. 351/200–246
See application file for complete search history.

(56) References Cited

U.S. PATENT DOCUMENTS

| 5,220,361 | A | * | 6/1993 | Lehmer | A61B 3/113 351/210 |
|---|---|---|---|---|---|
| 8,260,451 | B2 | | 9/2012 | Takeichi | |
| 8,820,931 | B2 | * | 9/2014 | Walsh | A61B 3/102 351/206 |
| 2010/0311310 | A1 | | 12/2010 | Takeichi | |
| 2011/0090452 | A1 | * | 4/2011 | Kulas | G02C 7/16 351/45 |
| 2013/0242262 | A1 | * | 9/2013 | Lewis | G02B 27/0093 351/209 |

FOREIGN PATENT DOCUMENTS

| JP | 2000-218487 A | 8/2000 |
|---|---|---|
| JP | 2010-280018 A | 12/2010 |

* cited by examiner

*Primary Examiner* — Mohammed Hasan
(74) *Attorney, Agent, or Firm* — Sughrue Mion, PLLC

(57) ABSTRACT

An eyeglass lens processing apparatus includes a lens chuck unit that holds an eyeglass lens; a processing unit that has a processing tool to process the eyeglass lens held by the lens chuck unit; and an adjustment unit that adjusts a relative distance between the eyeglass lens and the processing tool. The eyeglass lens processing apparatus operates the processing unit and processes the eyeglass lens by operating the adjustment unit based on processing data. The eyeglass lens processing apparatus includes a check unit that checks whether or not the eyeglass lens is properly processed in a state where the eyeglass lens is held by the lens chuck unit.

16 Claims, 14 Drawing Sheets

EYEGLASS LENS PROCESSING APPARATUS

CROSS REFERENCE TO RELATED APPLICATION

This application is based upon and claims the benefit of priority of Japanese Patent Application No. 2013-074333 filed on Mar. 29, 2013, the contents of which are incorporated herein by reference in its entirety.

BACKGROUND

The present invention relates to an eyeglass lens processing apparatus that processes an eyeglass lens.

There is a known eyeglass lens processing apparatus that includes a processing tool and processes an eyeglass lens chucked by a chuck shaft.

For example, there are an eyeglass lens processing apparatus which grinds an eyeglass lens by a grindstone (refer to JP-A-2010-280018), an eyeglass lens processing apparatus which cuts the eyeglass lens using a plurality of cutting tools (refer to JP-A-2000-218487), and the like.

SUMMARY

Incidentally, in the related art, for example, in order to determine whether or not there is a malfunction in a processing tool, a sensor such as a photo-interrupter, a micro-switch or the like is adopted to check the processing tool itself. For example, the photo-interrupter is configured to include a light source and a light receiving element, and checks break and the like of the processing tool by blocking light oriented toward the light receiving element from the light source using the processing tool. When the processing tool is disposed at a position blocking light oriented toward the light receiving element from the light source, if there is no change in a light receiving signal of the light receiving element, it is determined that the processing tool is bent.

For example, if the micro-switch is adopted, the micro-switch is pressed by the processing tool. The micro-switch is configured to output a detection signal when pressed. When the processing tool is disposed at a position where the micro-switch is pressed to be in contact therewith, if the detection signal is output from the micro-switch, it is determined that there is no malfunction in the processing tool. If there is no detection signal output, it is determined that there is an occurrence of a malfunction such as break in the processing tool.

As a problem to be solved in the above-described configuration, it is necessary to move an object to a position where a sensor is present to check the processing tool, thereby taking a long processing time. In addition, as another problem to be solved in the above-described configuration, it is necessary to provide a dedicated sensor.

In addition, as another problem to be solved, since the sensor is pressed using the processing tool, a durability life of the processing tool is lessened, thereby causing a scratch or an abrasion in a portion pressed by the sensor.

In consideration of the above-described problem in the related art, the present invention aims to technically solve the problem by providing an eyeglass lens processing apparatus which can efficiently and easily process an eyeglass lens. In consideration of the above-described problem in the related art, the present invention aims to technically solve another problem by providing the eyeglass lens processing apparatus which is not necessarily provided with the dedicated sensor.

In order to solve the above-described problems, the present invention includes the non-limiting configurations described below.

An eyeglass lens processing apparatus configured to process an eyeglass lens based on processing data. The apparatus includes a lens chuck unit configured to hold the eyeglass lens, a processing unit including a processing tool configured to process the eyeglass lens held by the lens chuck unit, an adjustment unit configured to adjust a relative distance between the eyeglass lens and the processing tool; a processor; and memory storing computer readable instructions. When executed by the processor, the computer readable instructions cause the eyeglass lens processing apparatus to function as a check unit to check whether or not the eyeglass lens is properly processed in a state where the eyeglass lens is held by the lens chuck unit.

The computer readable instructions when executed by the processor can cause the eyeglass lens processing apparatus to function as a determination unit configured to determine whether or not there is a malfunction in the processing unit based on a check result of the check unit.

The eyeglass lens processing apparatus can be configured to process a rim of the eyeglass lens by operating the processing unit, wherein the check unit checks for the presence or absence of an unprocessed portion of the eyeglass lens in a region further away from a chuck shaft of the lens chuck unit than a processing path along which the rim of the eyeglass lens is to be processed based on the processing data, and the determination unit determines that there is a malfunction in the processing unit if the unprocessed portion is present.

The check unit can check for the presence or absence of the unprocessed portion of the eyeglass lens only at one radius vector angle.

The check unit also can check for the presence or absence of the unprocessed portion of the eyeglass lens at a plurality of radius vector angles.

The check unit also can calculate a check position of the eyeglass lens related to the radius vector angle based on the processing data.

The eyeglass lens processing apparatus can processes a whole circumference of the rim of the eyeglass lens by relatively moving at least one of the processing tool and the eyeglass lens along a processing path based on the processing data, and the check unit can determine at least one check position based on a radius vector angle at a beginning of processing or an end of the processing in the processing path and can check for the presence or absence of the unprocessed portion at the determined check position.

The eyeglass lens processing apparatus can process the rim of the eyeglass lens over 360 degrees in the whole circumference by at least any one of rotations of the lens chuck unit and movements of the processing tool, and the check unit can acquire at least one of the radius vector angles of the eyeglass lens which is processed after the half of the circumference passes through based on the processing data and can check for the presence or absence of the unprocessed portion of the eyeglass lens at the acquired radius vector angle.

The eyeglass lens processing apparatus can process the whole circumference of the rim of the eyeglass lens by relatively moving at least one of the processing tool and the eyeglass lens along the processing path, and the check unit can determine the check position in the latter half of the circumference from the beginning of the processing or the end of the processing in the processing path.

The check unit can include a calculator configured to calculate the check position of the eyeglass lens in a circumferential direction based on a diameter of the processing tool and a radius vector length of a target lens shape.

The check unit can include a positional information measurement unit configured to measure at least one of front surface positional information and rear surface positional information of the eyeglass lens corresponding to target lens shape data, wherein the check unit checks whether or not the eyeglass lens is properly processed based on a measurement result related to at least one of the front surface positional information and the rear surface positional information of the eyeglass lens.

After measuring at least one of the front surface positional information and the rear surface positional information of the eyeglass lens corresponding to the target lens shape data, the check unit can sequentially check whether or not the eyeglass lens is properly processed.

After measuring at least one of the front surface positional information and the rear surface positional information of the eyeglass lens corresponding to the target lens shape data in a chuck shaft direction of the lens chuck unit is completed over 360 degrees in the whole circumference, the check can unit check whether or not the eyeglass lens is properly processed at least at a measurement completion position where the measuring is completed.

The eyeglass lens processing apparatus can further include a notification unit configured to notify an operator of a determination result determined by the determination unit.

The eyeglass lens processing apparatus can further include a target lens shape acquisition unit configured to acquire a target lens shape data of the eyeglass lens, wherein the check unit includes a radius vector length measurement unit configured to measure a radius vector length which is a diameter of the eyeglass lens held by the lens chuck unit, and wherein the check unit determines that the eyeglass lens is not properly processed when the radius vector length of the processed eyeglass lens measured by the radius vector length measurement unit is different from a radius vector length estimated based on the target lens shape data.

According to yet another embodiment, an eyeglass lens processing system is provide having a plurality of eyeglass lens processing apparatuses configured to process an eyeglass lens based on processing data, each of the plurality of eyeglass lens processing apparatuses having: a lens chuck unit configured to hold the eyeglass lens; a processing unit including a processing tool configured to process the eyeglass lens held by the lens chuck unit; an adjustment unit configured to adjust a relative distance between the eyeglass lens and the processing tool; a processor; and memory storing computer readable instructions. When the computer readable instructions are executed by the processor, the eyeglass lens processing apparatus functions as: a check unit configured to check whether or not the eyeglass lens is properly processed in a state where the eyeglass lens is held by the lens chuck unit. The system includes a conveyer configured to convey the eyeglass lens to the plurality of eyeglass lens processing apparatus; and a conveyer controller configured to control an operation of the conveyer, select one of the eyeglass lens processing apparatuses to which the eyeglass lens is conveyed based on a check result of the check unit, and controls conveying of the eyeglass lens.

According to the present invention, for example, an eyeglass lens can be efficiently and easily processed. In addition, a dedicated sensor is not required to be provided.

DESCRIPTION OF EXEMPLARY EMBODIMENTS

Overview

Figure 1A:
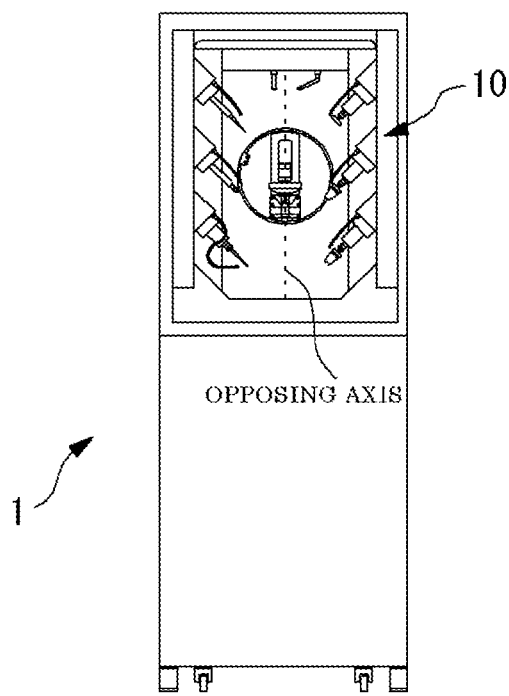
FIGS. 1A and 1B are schematic configuration views of an apparatus main body of an eyeglass lens processing apparatus.

Hereinafter, an overview of an exemplary embodiment will be described. The present apparatus includes a lens chuck unit that holds an eyeglass lens, a processing unit that has a processing tool to process the eyeglass lens held by the lens chuck unit; and an adjustment portion that adjusts a relative distance between the eyeglass lens and the processing tool. For example, the present apparatus operates the processing unit and processes the eyeglass lens by operating the adjustment portion based on processing data. The present apparatus may include a control portion that operates an adjustment portion based on target lens shape data.

As a configuration to adjust the relative distance between the eyeglass lens and the processing tool, the processing tool may be configured to move with respect to the eyeglass lens, or the eyeglass lens may be configured to move with respect to the processing tool. In other words, it is acceptable as long as the eyeglass lens and the processing tool are adjusted in a relative positional relationship therebetween.

For example, a processing apparatus is an eyeglass lens processing apparatus which can process a rim of the eyeglass lens by operating a processing unit. Naturally, it is acceptable as long as the apparatus processes an eyeglass lens. For example, the processing apparatus may be a processing apparatus which bores a hole in the eyeglass lens.

<Check Unit>

For example, the present apparatus includes a check unit that checks whether or not the eyeglass lens is properly processed in a state where the eyeglass lens is held by the lens chuck unit.

As the check unit, for example, a lens shape detection unit is adopted to measure a shape of the eyeglass lens held by the lens chuck unit. Naturally, without being limited thereto, the check unit may be a lens residue check unit that checks processed lens residue (detailed description will be given later).

For example, the present apparatus may include a determination unit (for example, control portion 70) that determines whether or not there is a malfunction in the processing unit based on a check result by the check unit. Accordingly, a checker or an apparatus can easily check a malfunction of the processing unit. The check result of check unit may be notified to an operator.

In a case of the eyeglass lens processing apparatus which can process the rim of the eyeglass lens, for example, the check unit may check for the presence or absence of an unprocessed portion of the eyeglass lens in a region further away from a chuck shaft of the lens chuck unit than a processing path which is adopted when processing the rim of the eyeglass lens. The determination unit determines that there is a malfunction in the processing unit if a check result of presence of the unprocessed portion is obtained.

In a case where the check unit checks for the presence or absence of the unprocessed portion of the eyeglass lens, the checking may be limited to one radius vector angle. Accordingly, the checking time is lessened. The check unit may check for the presence or absence of the unprocessed portion, at a plurality of radius vector angles.

In addition, the check unit may calculate a check position of the eyeglass lens related to the radius vector angle based on the processing data.

For example, in a case where the processing apparatus is an apparatus which processes the whole circumference of the rim of the eyeglass lens by relatively moving at least one of the processing tool and the eyeglass lens along the processing path, the check unit may determine at least one check position based on the radius vector angle at the beginning of processing or the end of the processing in the processing path and may check for the presence or absence of the unprocessed portion at the determined check position.

For example, in a case where the processing apparatus is an eyeglass lens processing apparatus which can process the rim of the eyeglass lens over 360 degrees in the whole circumference by at least any one of rotations of the lens chuck unit and movements of the processing tool, the check unit may acquire at least one of the radius vector angles of the eyeglass lens which is processed after the half of the circumference passes through based on the processing data. The check unit may check for the presence or absence of the unprocessed portion of the eyeglass lens causing a specified radius vector angle to be the check position.

For example, in a case where the processing apparatus is an eyeglass lens processing apparatus which processes the whole circumference of the rim of the eyeglass lens by relatively moving at least one of the processing tool and the eyeglass lens along the processing path, the check unit may determine the check position in the latter half of the circumference from the beginning of the processing or the end of the processing in the processing path.

In addition, the check unit may calculate the check position of the eyeglass lens related to a circumferential direction based on a diameter of the processing tool and a radius vector length of a target lens shape.

<Utilization of Lens Shape Measurement Unit>

The present apparatus may have a positional information measurement unit that measures at least one of front surface positional information and rear surface positional information of the eyeglass lens corresponding to target lens shape data.

The check unit may also serve as the positional information measurement unit and may check whether or not the eyeglass lens is properly processed based on a measurement result related to at least one of a front surface position and a rear surface position of the eyeglass lens.

In addition, after measuring at least one of the front surface positional information and the rear surface positional information of the eyeglass lens corresponding to the target lens shape data, the check unit may sequentially check whether or not the eyeglass lens is properly processed.

In addition, after measuring at least one of the front surface positional information and the rear surface positional information of the eyeglass lens corresponding to the target lens shape in a chuck shaft direction of the lens chuck unit is completed over 360 degrees in the whole circumference, the check unit may check whether or not the eyeglass lens is properly processed in at least a measurement completion position thereof.

The present apparatus may be configured to further include a target lens shape acquisition portion to acquire the target lens shape data of the eyeglass lens and a radius vector length measurement portion that measures the radius vector length which is a diameter of the eyeglass lens held by the lens chuck unit.

The check unit may also serve as the radius vector length measurement portion and may determine that the eyeglass lens is not properly processed when the radius vector length of the processed eyeglass lens measured by the radius vector length measurement portion is different from a radius vector length estimated based on the target lens shape data.

<Control of Relative Speed>

For example, the control portion operates an adjustment portion based on the target lens shape data. The control portion may control a relative speed when shortening a relative distance based on a measurement result by the measurement unit that measures a first distance. The first distance is a distance from a central shaft of the lens chuck unit to an edge of an unprocessed eyeglass lens.

<Measurement Unit>

For example, the measurement unit may be the lens shape detection unit that measures a shape of the eyeglass lens held by the lens chuck unit (detailed description will be given later). The lens shape detection unit may be configured to be disposed in the present apparatus. In addition, without being limited thereto, the measurement unit may be a cup attachment apparatus (so-called intelligent blocker) which can detect a contour of the eyeglass lens by optical means. In this case, for example, the cup attachment apparatus measures an outer diameter of a lens with respect to an optical center or a frame center based on contour information of the eyeglass lens.

For example, until a distance between the central shaft and the processing tool reaches the first distance measured by the measurement unit, the control portion may cause the relative speed to be faster when shortening the relative distance than the relative speed when processing the eyeglass lens by the processing unit. In this case, for example, the configuration is not limited to causing the distance to be decreased at a high speed until reaching the first distance (detailed description will be given later).

For example, the measurement unit may also serve as a positional information measurement portion that is provided in the processing apparatus and measures at least one of the front surface positional information and the rear surface positional information of the eyeglass lens corresponding to the target lens shape data in the shaft direction of the lens chuck shaft.

For example, the measurement unit can measure first measurement and second measurement. The first measurement measures at least one of the front surface positional information and the rear surface positional information of the eyeglass lens corresponding to the target lens shape data over the whole circumference of the eyeglass lens, in the shaft direction of the lens chuck shaft. The second measurement measures a distance in a direction of the radius vector angle between an edge position of the unprocessed eyeglass lens and an edge position of the processed eyeglass lens which is calculated through the target lens shape data.

The measurement unit may measure the processing distance through adding a distance between the central shaft indicated by the target lens shape data related to the radius vector angle in which the second measurement is performed and the edge position of the processed eyeglass lens to a distance measured through the second measurement.

For example, the measurement unit may perform the second measurement at at least one of the radius vector angles after completion of the first measurement. In addition, the measurement unit may perform the second measurement at at least the measurement completion position thereof after completion of the first.

In addition, the control portion may set the edge position of the unprocessed eyeglass lens which is an edge position corresponding to the radius vector angle in which the second measurement is performed as a processing start position of the eyeglass lens to start the processing. The control portion may perform the processing related to other radius vector angles after performing the processing related to the radius vector angle in which the second measurement is performed.

<Acquisition of Processing Distance>

The present apparatus may have a processing distance acquisition portion acquiring a second distance at the radius vector angle of the eyeglass lens when adjusting the relative distance by the adjustment portion at the beginning of the processing, that is, a distance from the center of the unprocessed eyeglass lens held by the lens chuck unit to an edge. In this case, the control portion controls the adjustment portion so as to change the relative speed when adjusting the relative distance at the beginning of the processing based on the acquired second distance. The processing distance acquisition portion may be configured to be provided in an apparatus main body. The processing distance acquisition portion may be configured to acquire data from an external apparatus.

Specification Example of Embodiment

Figure 1B:
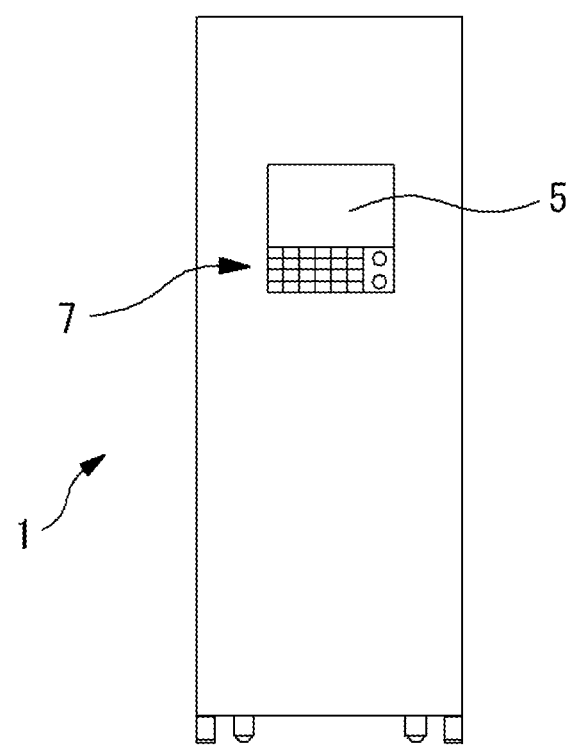

A specification example according to the embodiment of the present invention will be described with reference to the drawings. FIGS. 1A and 1B are schematic configuration views of the apparatus main body of the eyeglass lens processing apparatus to which the present invention is applied. FIG. 1A is the schematic configuration view of the eyeglass lens processing apparatus 1 seen from the front. FIG. 1B is the schematic configuration view seen from a side. On an upper portion of the eyeglass lens processing apparatus 1, a lens processing portion 10 is provided to process a lens. In addition, the side surface of the eyeglass lens processing apparatus 1 includes a display 5 having a touch panel function for inputting data such as a processing condition and the like, and a switch portion 7 provided with a processing start switch and the like. The display 5 and the switch portion 7 may not be included on the side surface but may be included on the front surface. In addition, the display 5 and the switch portion 7 may be provided at positions away from each other, and may be provided to be close to each other.

Figure 2:
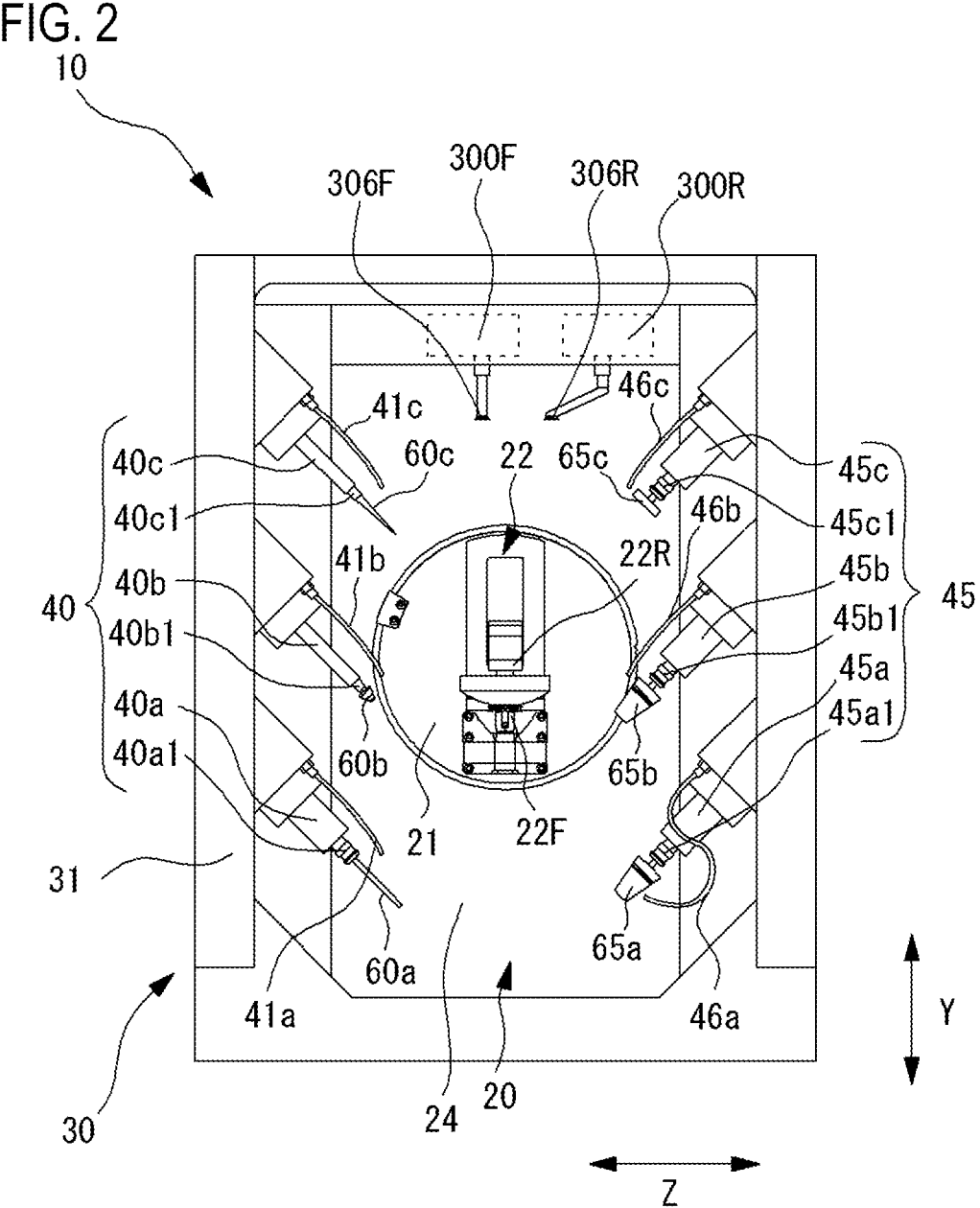
FIG. 2 illustrates a schematic configuration view of a lens processing portion.

FIG. 2 illustrates a schematic configuration view of the lens processing portion 10. Hereinafter, a configuration of the lens processing portion 10 will be described. The lens processing portion 10 includes a lens chuck unit 20 and a spindle holding unit 30. According to the present embodiment, in FIG. 2, an inward direction (orthogonal direction) with respect to the paper is an X-direction, a horizontal direction (transverse direction) is a Z-direction, and a vertical direction (up-down direction) is a Y-direction in the description.

<Lens Chuck Unit>

The lens chuck unit 20 holds an eyeglass lens LE and moves the eyeglass lens LE with respect to the spindle holding unit 30. The lens chuck unit 20 is provided with a carriage 21 and a base 24. The carriage 21 includes a pair of lens chuck shafts 22 (22F, 22R) to chuck the eyeglass lens LE.

<Rotational Mechanism of Lens Chuck Shaft>

Figure 3:
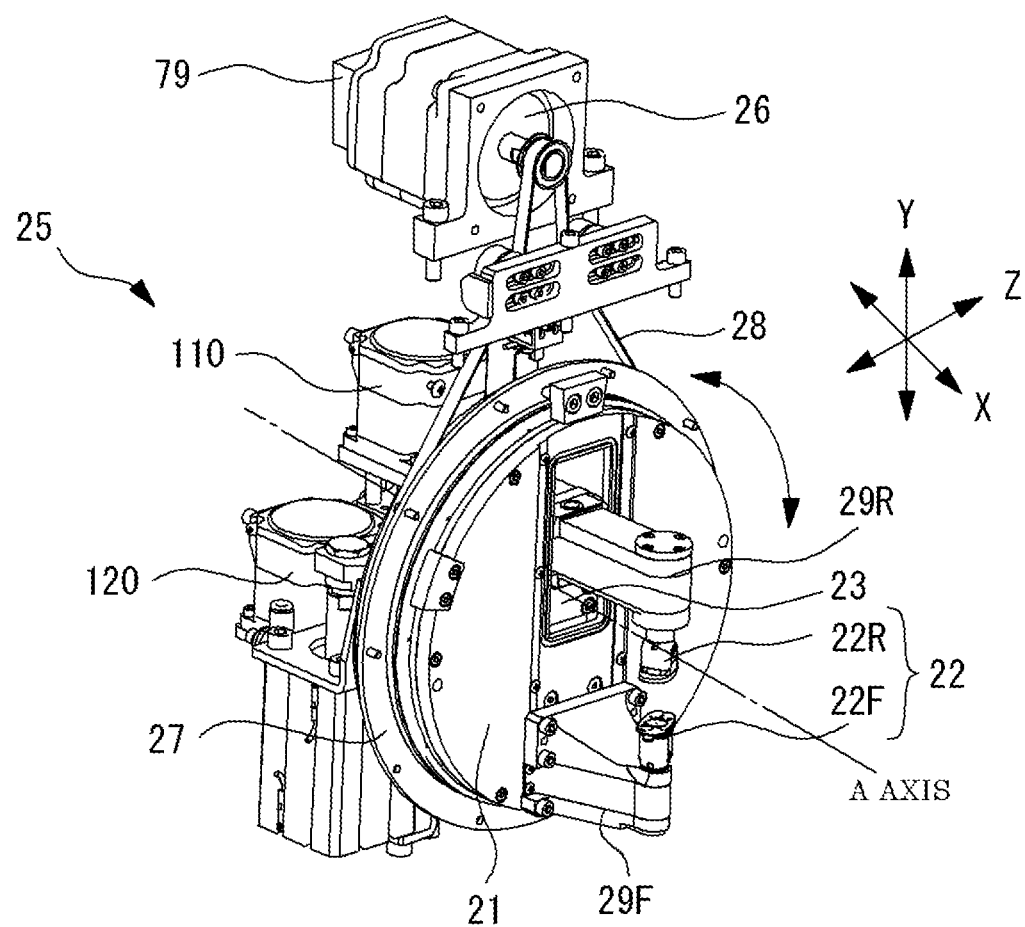
FIG. 3 is a schematic configuration view of a lens chuck unit.

FIG. 3 is a schematic configuration view of the lens chuck unit 20. A holding arm 29F which rotatably holds the lens chuck shaft 22F is fixed to a front side of the carriage 21. On the rear surface of the carriage 21, there is provided a chuck table 23 which is movable on two laterally extending guide rails (not illustrated). A holding arm 29R which rotatably holds the lens chuck shaft 22R is fixed to the chuck table 23. In addition, in the chuck table 23, there is provided a pressure drive source (not illustrated) which moves the chuck table 23 in a parallel manner with respect to the lens chuck shaft 22. The pressure drive source is configured to have an air pump, a valve, piston and the like. The air pump is adopted for pneumatic feeding of air. The piston is fixed to the chuck table 23. The valve is provided in a sealed space where the piston is disposed. Introduction of air to the sealed space is adjusted by opening and closing the valve. The pressure drive source moves the piston in the parallel manner with respect to the lens chuck shaft by adjusting the introduction of air in the sealed space. Accordingly, together with the chuck table 23, the holding arm 29R and the lens chuck shaft 22R are moved to the lens chuck shaft 22F side in the parallel manner which is provided in the carriage 21. Then, the lens chuck shaft 22F and the lens chuck shaft 22R chuck the eyeglass lens LE. The lens chuck shaft 22F and the lens chuck shaft 22R are disposed in a coaxial relationship.

In the lens chuck unit 20, there is provided a drive source (for example, motor) 110. The motor 110 is adopted to rotate the lens chuck shaft 22R about the shaft thereof. The lens chuck shaft 22R is rotated through a rotation transmission mechanism such as a timing-belt, a pulley and the like by rotational drive of the motor 110.

In addition, in the lens chuck unit 20, there is provided a drive source (for example, motor) 120. The motor 120 is adopted to rotate the lens chuck shaft 22F about the shaft (central shaft of chuck) thereof. The lens chuck shaft 22F is rotated using the motor 120 through the rotation transmission mechanism such as the timing-belt, the pulley and the like by the rotation drive of the motor 120. Encoders which detect a rotational angle of the lens chuck shafts 22F and 22R are attached to the rotation shaft of the motors 110 and 120. The motors 110 and 120 are synchronized to be driven. In other words, the lens chuck shafts 22F and 22R are synchronized for the rotational drive. The lens rotation unit is configured therewith.

<Rotational Drive Mechanism of Carriage>

In the lens chuck unit 20, there is provided a shaft angle change mechanism (shaft angle change means) 25. The shaft angle change mechanism 25 is adopted for switching the processing tool or adjusting the relative position between the eyeglass lens and the processing tool when processing the eyeglass lens (detailed description will be given later). The shaft angle change mechanism 25 is configured to have a drive source (for example, motor and the like) 26, a pulley 27, a timing-belt 28, an encoder 79. The pulley 27 is fixed to the carriage 21. The encoder 79 is attached to the motor 26, and rotation of the motor 26 is detected by the encoder 79. If the motor 26 is rotationally driven, the rotation of the motor 26 is transmitted to the pulley 27 through the timing-belt 28. The carriage 21 is rotationally driven about the central shaft (A-axis) of the carriage 21 as a rotational center with respect to the base 24 by rotating the pulley 27. Accordingly, a shaft angle of the lens chuck shaft 22 is changed (rotated) about the A-axis in accordance with the rotational drive of the carriage 21.

<X-Axis and Z-Axis Drive Mechanism>

Figure 4:
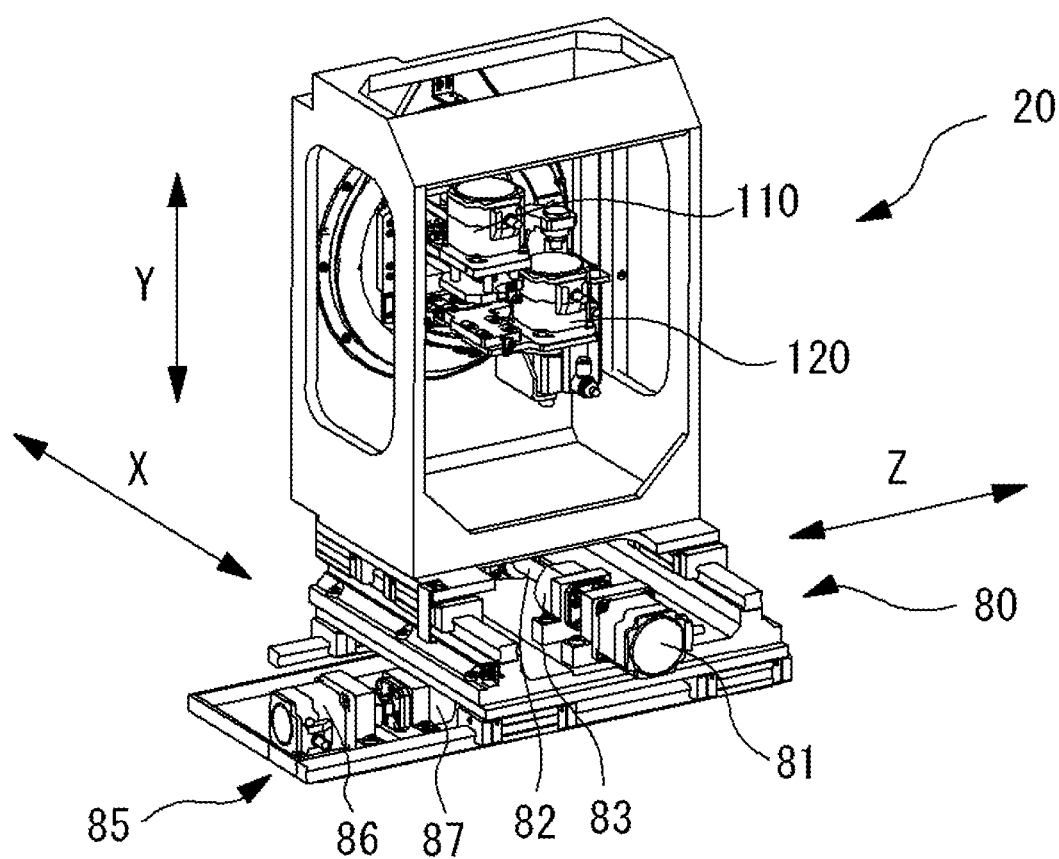
FIG. 4 is a view describing a drive mechanism of the lens chuck unit in an X-axis direction and a Z-axis direction.

FIG. 4 is a view describing a drive mechanism of the lens chuck unit 20 in an X-axis direction and a Z-axis direction. In the lens chuck unit 20, there are provided each of the drive mechanisms (X-axis drive mechanism 80, Z-axis drive mechanism 85) which respectively move the lens chuck unit 20 in the X-direction and the Z-direction with respect to the spindle holding unit 30.

The X-axis drive mechanism 80 includes a drive source (motor) 81. A shaft 82 extending toward the X-axis direction is directly connected to the motor 81. In addition, an encoder 83 detecting a movement position of the lens chuck unit 20 in the X-axis direction is attached to a rotational shaft of the motor 81. A screw groove is formed on an outer periphery of the shaft 82. A movement member (for example, nut) (not illustrated) as a bearing fits the tip of the shaft 82. The lens chuck unit 20 is fixed to the movement member. If the motor 81 is rotationally driven, the lens chuck unit 20 moves along the shaft 82 extending in the X-axis direction. Accordingly, the lens chuck shafts 22F and 22R are linearly moved in the X-axis direction together with the carriage 21.

The Z-axis drive mechanism 85 includes a drive source (motor) 86. A shaft (not illustrated) extending toward the Z-axis direction is directly connected to the motor 86. In addition, an encoder 87 detecting a movement position of the lens chuck unit 20 in the Z-axis direction is attached to a rotational shaft of the motor 86. A screw groove is formed on an outer periphery of the shaft. A movement member (for example, nut) (not illustrated) as a bearing fits the tip of the shaft. The lens chuck unit 20 is fixed to the movement member. If the motor 86 is rotationally driven, the lens chuck unit 20 moves along the shaft extending in the Z-axis direction. Accordingly, the lens chuck shafts 22F and 22R are linearly moved in the Z-axis direction together with the carriage 21.

<Spindle Holding Unit>

In FIG. 2, the spindle holding unit 30 is provided with a movement support base 31, a first processing unit 40, a second processing unit 45, and lens shape detection units 300F and 300R. On left and right side surfaces of the movement support base 31, the first processing unit 40 and the second processing unit 45 are disposed. The lens shape detection units 300F and 300R function as a lens shape measurement unit to measure a shape of a lens.

<Processing Unit>

As illustrated in FIG. 2, the first processing unit 40 is disposed on the left side surface of the movement support base 31 and is provided with three spindles 40a, 40b and 40c. In addition, the second processing unit 45 is disposed on the right side surface of the movement support base 31 and is provided with three spindles 45a, 45b and 45c. The three spindles 40a, 40b and 40c of the first processing unit 40 respectively have rotational shafts 40a1, 40b1 and 40c1, and each of processing tools 60a, 60b, and 60c is attached to a shaft same as each of the rotational shafts thereof. In addition, the spindles 45a, 45b and 45c of the second processing unit 45 respectively have rotational shaft 45a1, 45b1 and 45c1, and each of the processing tools 65a, 65b and 65c is attached to the shaft same as each of the rotational shafts thereof. Each processing tool is adopted as a processing tool to process the eyeglass lens. Each of the rotational shafts of the spindles is rotated by each of the drive sources (for example, motors) respectively disposed in the rear of each spindle through the rotation transmission mechanism disposed inside each of the spindles.

For example, in the present example, an end mill or a cutter as a rough-edging tool is disposed in a processing tool 60a. The processing tool 60a is adopted to cut the unprocessed eyeglass lens LE before fine-edging. A cutter as a groove-finishing tool (grooving tool) is disposed in a processing tool 60b. An end mill as a boring tool to bore a hole on a refractive surface of the lens LE is disposed in a processing tool 60c. A polishing grindstone as a polishing tool is disposed in a processing tool 65a. The polishing tool is adopted to polish a lens surface of the eyeglass lens LE using water. A cutter as a fine-edging tool having a conical shape is disposed in a processing tool 65b. A bevel groove (V-groove) to form a bevel on the rim of the lens LE, and a flat-processing surface to perform flat-processing the rim of the lens LE are formed in the fine-edging tool 65b which is adopted to perform beveling and the fine-edging on the lens rim subject to rough-edging. In addition, the fine-edging tool 65b (flat-processing) also serves as a chamfer-finishing tool. A stepped-edging tool to further perform stepped-edging on the lens rim which is subject to the beveling is disposed in the processing tool 65c.

In the vicinity of each spindle, there are respectively provided hoses 41a, 41b, 41c, 46a, 46b and 46c to supply air or water. The hoses 41a, 41b, 41c, 46a, 46b and 46c are adopted to remove cut pieces of a processed eyeglass lens. In addition, the hose 46a is adopted to supply water which is used when processing an eyeglass lens. Naturally, the hose can be arbitrarily replaced in accordance with usage. For example, the water hose may be replaced with an air hose.

Each spindle is disposed in a state where the tip end of the spindle tilts downward (gravity direction). In the present example, each spindle is disposed to tilt downward from the Z-axis direction (horizontal direction) by 45 degrees in tilt angle.

<Y-Axis Drive Mechanism>

Figure 5:
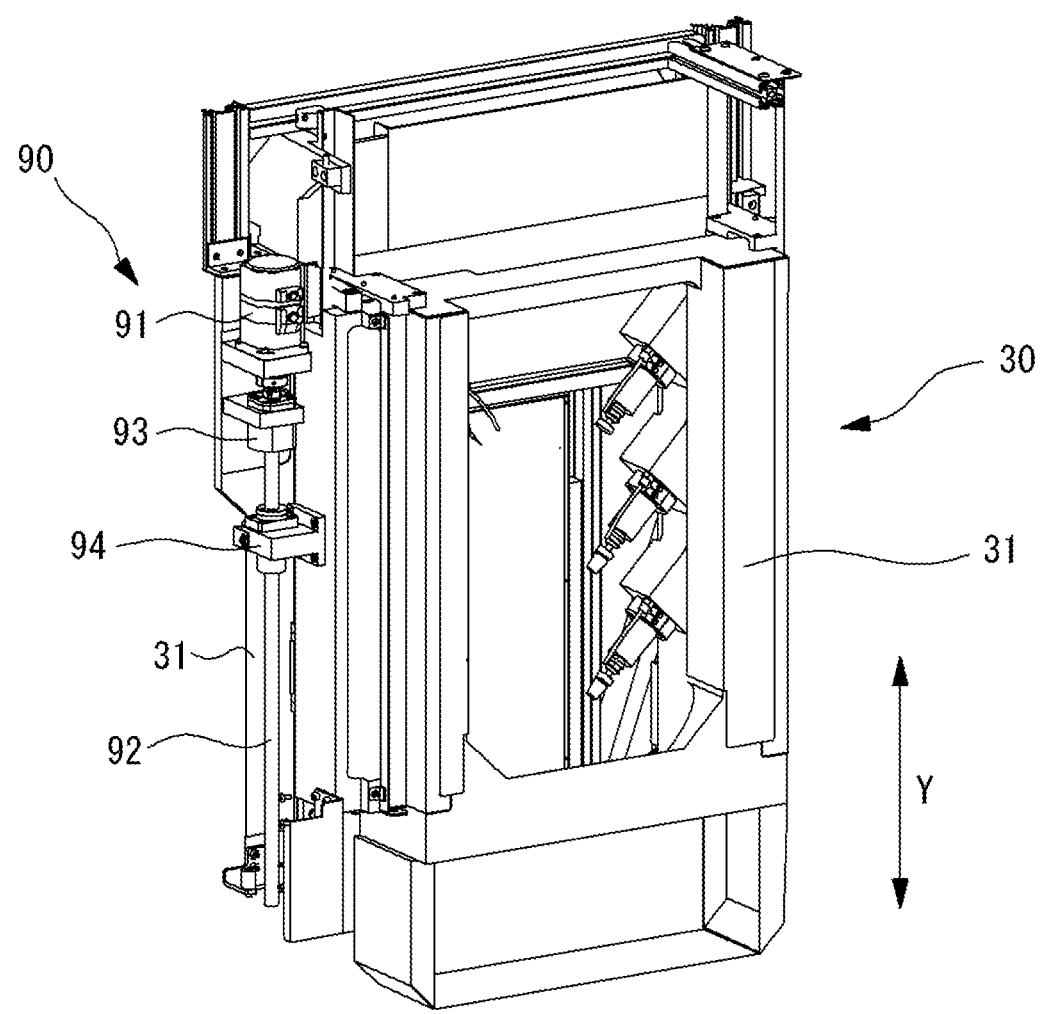
FIG. 5 is a view describing a drive mechanism of a spindle holding unit in a Y-axis direction.

FIG. 5 is a view describing the drive mechanism of the spindle holding unit 30 in the Y-axis direction. The spindle holding unit 30 is provided with each of the drive mechanisms (Y-axis drive mechanism 90) which move the spindle holding unit 30 in the Y-axis direction with respect to the lens chuck unit 20.

The Y-axis drive mechanism 90 includes a drive source (motor) 91. A shaft 92 extending toward the Y-axis direction is directly connected to the rotational shaft of the motor 91. In addition, an encoder 93 detecting a movement position of the spindle holding unit 30 in the Y-axis direction is attached to the motor 91. A screw groove is formed on an outer periphery of the shaft 92. A movement member (for example, nut) 94 as a bearing fits the tip of the shaft 92. A movement support base 31 is fixed to the movement member 94. If the motor 91 is rotationally driven, the movement support base 31 moves along the shaft extending in the Y-axis direction. Accordingly, the spindle holding unit 30 is linearly moved in the Y-axis direction. A spring (not illustrated) is installed in the movement support base 31, thereby eliminating a downward load of the movement support base 31 and making the movement thereof easy.

In the configuration of the processing unit described above, the Y-axis drive mechanism 90 and the Z-axis drive mechanism 85 configure movement mechanisms to change relative positional relationships of the lens chuck shaft 22 with respect to the rotational shafts (40$a$1, 40$b$1, 40$c$1, 45$a$1, 45$b$1, 45$c$1) of the processing tools. Moreover, as the movement mechanisms thereof, the Y-axis drive mechanism 90 and the Z-axis drive mechanism 85 configure a mechanism which changes a shaft-to-shaft distance between the rotational shaft of the processing tool and the lens chuck shaft 22, and a mechanism which moves the lens chuck shaft 22 in the shaft direction of the lens chuck shaft 22.

In addition, the X-axis drive mechanism 80, the Z-axis drive mechanism 85 and the Y-axis drive mechanism 90 configure movement units which move the eyeglass lens and each processing tool relatively. In addition, for example, the X-axis drive mechanism 80, the Z-axis drive mechanism 85 and the Y-axis drive mechanism 90 are adopted as configurations to adjust the relative distance between the eyeglass lens and each processing tool.

<Lens Shape Detection Unit>

In FIG. 2, the lens shape detection units (lens edge shape measurement units) 300F and 300R are provided above the carriage 21. The lens shape detection unit 300F is an edge position measurement unit detecting positional (front surface side position of lens on target lens shape) information of the front surface of the lens. The lens shape detection unit 300R is an edge position measurement unit detecting positional (rear surface side position of lens on target lens shape) information of the rear surface of the lens.

Figure 6:
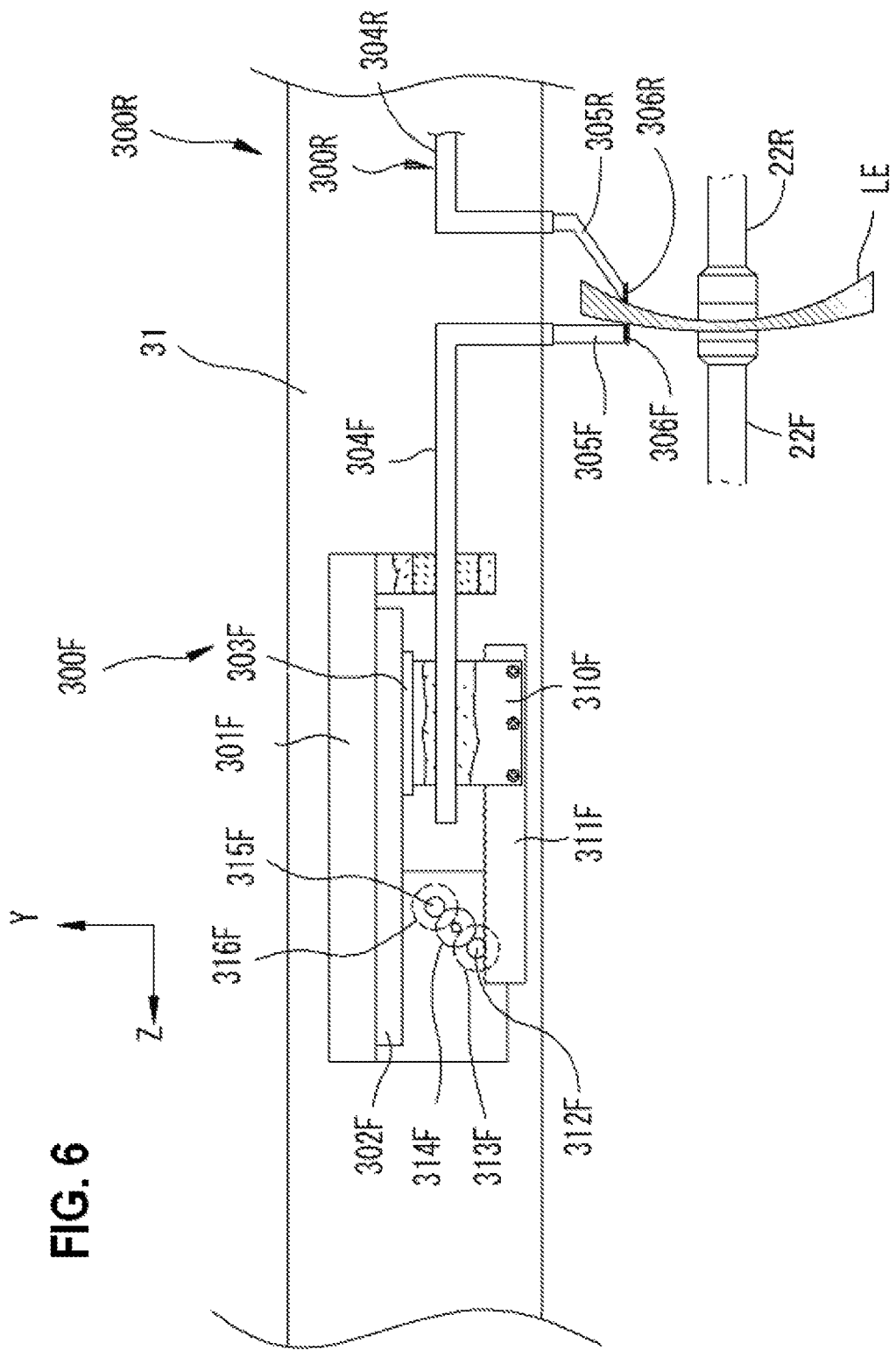
FIG. 6 is a schematic configuration view of a lens shape detection unit that measures an edge position of a front surface of a lens.

FIG. 6 is a schematic configuration view of the lens shape detection unit 300F measuring an edge position of the front surface of the lens. The configuration of the lens shape detection unit 300F will be described. An attachment support base 301F is fixed to the movement support base 31. A rail 302F extending in the Z-direction is fixed to the attachment support base 301F. A slider 303F is attached to be slidable on the rail 302F. A slide base 310F is fixed to the slider 303F, and a tracing stylus arm 304F is fixed to the slide base 310F. A hand 305F is fixed to the tip end portion of the tracing stylus arm 304F, and a tracing stylus 306F is fixed to the tip end of the hand 305F. As the slider 303F slides in the Z-direction, the tracing stylus 306F also moves in the Z-direction.

A rack 311F is fixed to a lower end portion of the slide base 310F. The rack 311F is engaged with a pinion 312F of the encoder 313F which is fixed to the attachment support base 301F side. In addition, rotations of a motor 316F are transmitted to the rack 311F through a gear 315F, an idle gear 314F, the pinion 312F, thereby causing the slide base 310F to move in the Z-axis direction. While measuring the lens edge position, the motor 316F continuously presses the tracing stylus 306F to the lens LE with a constant force. The pressing force of the tracing stylus 306F by the motor 316F with respect to the lens refractive surface is applied with a weak force so as not to scratch the lens refractive surface. As means for applying the pressing force to the lens refractive surface of the tracing stylus 306F, it is possible to employ known pressure applying means such as a spring. The encoder 313F acquires rotational information such as a rotation amount and a rotational angle of the motor 316F, thereby transmitting to a control portion 70. The control portion 70 detects a movement position of the slide base 310F based on the rotational information received from the encoder 316F, thereby detecting the movement position of the tracing stylus 306F in the X-axis direction. Through the information of this movement position, the information of the rotational angle of the lens chuck shafts 22F and 22R, and the movement information in the Y-axis direction, the front surface position (including edge position in front surface of lens) of the lens LE is measured.

Since a configuration of the measurement portion 300R which measures the rear surface position (including edge position in rear surface of lens) of the lens LE can be described in a manner same as the measurement portion 300F, the reference sign "F" at the end of the reference numeral which is applied to each configuration element of the measurement portion 300F illustrated in FIG. 6 is replaced with the reference sign "R", and thereby description thereof is omitted.

When measuring the lens edge position, first, the lens chuck shafts 22F and 22R are positioned in the Z-axis direction by the shaft angle change mechanism 25. Thereafter, the tracing stylus 306F is brought into contact with the front surface of the lens, and thus, the tracing stylus 306R comes into contact with the rear surface of the lens. The spindle holding unit 30 is moved in the Y-axis direction based on the target lens shape data in this state, and the lens LE is rotated. Accordingly, the edge positions (positions in lens chuck shaft direction) of the front surface of the lens and the rear surface of the lens on which the lens processing is performed are measured simultaneously. The tracing stylus 306F and the tracing stylus 306R may be configured to be integrally movable in the Z-axis direction. In this case, in the edge position measurement unit, the front surface of the lens and the rear surface of the lens are separately measured. In addition, in the lens shape detection units 300F and 300R, although the lens chuck shafts 22F and 22R are caused to move in the Y-axis direction, it is possible to set the mechanism causing the tracing stylus 306F and the tracing stylus 306R to move in the Y-axis direction relatively.

<Controller>

Figure 7:
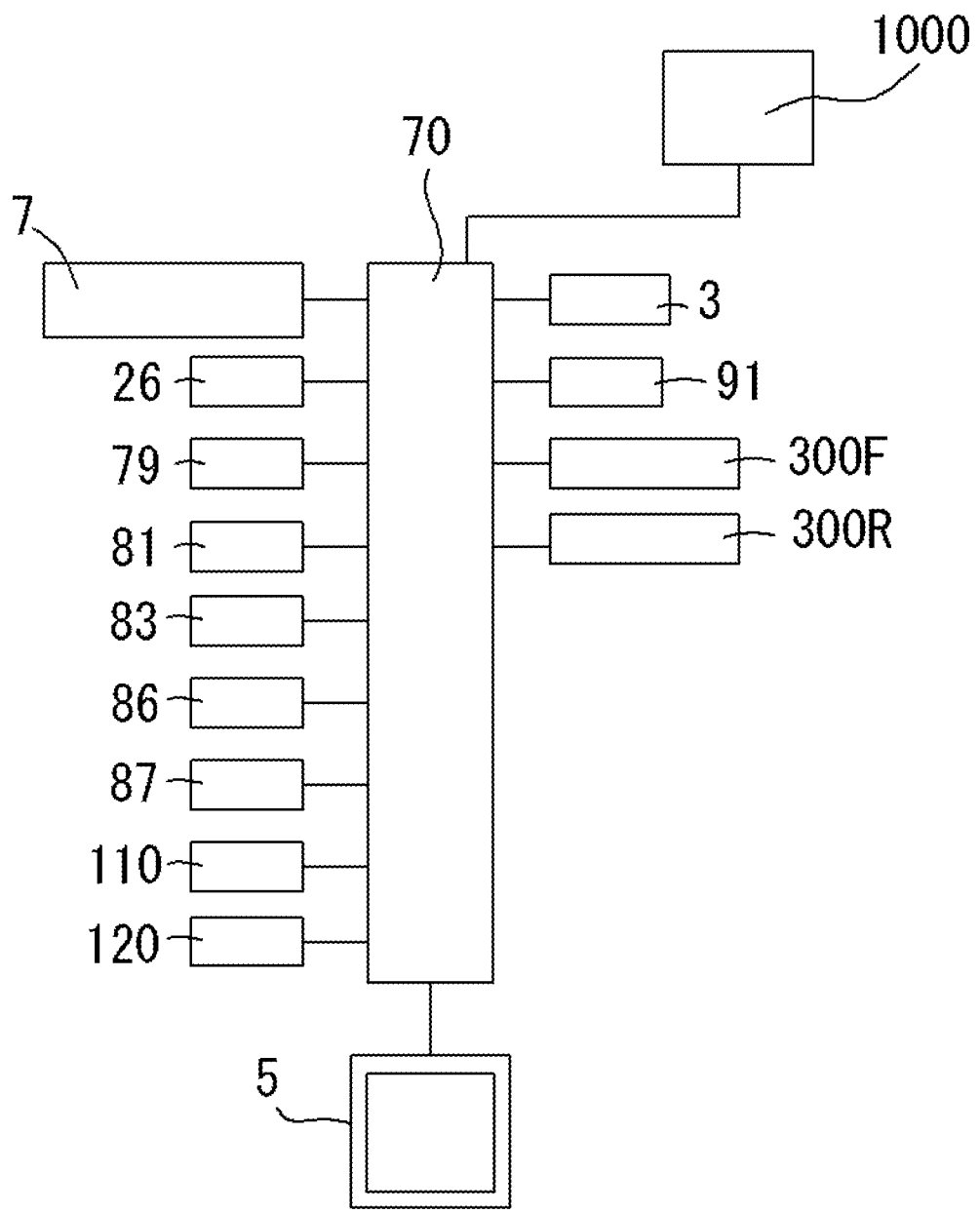
FIG. 7 is a control block diagram of the eyeglass lens processing apparatus.

FIG. 7 is a control block diagram of the eyeglass lens processing apparatus. The control portion (controller) 70 is connected to the motor 26, the encoder 79, the motor 81, the encoder 83, the motor 86, the encoder 87, the motor 91, the motor 110, the motor 120, the motor disposed inside each spindle (not illustrated), the pressure drive source (not illustrated), and the lens shape detection units 300F and 300R. The control portion 70 includes a processor (CPU, etc.) and memory storing computer readable instructions which is executed by the processor to perform a control operation as described below.

In addition, the control portion 70 is connected to the display 5 having the touch panel function for inputting data such as the processing condition, the switch portion 7 provided with the processing start switch and the like, a memory 3, a host computer 1000 and the like. The display 5 and the host computer 1000 function as target lens shape acquisition means for acquiring processing data which is necessary for the lens processing such as the target lens shape data and layout data of an optical center of the eyeglass lens with respect to the target lens shape.

<Control Operation>

Hereinafter, a control operation of the eyeglass lens processing apparatus 1 according to the present example will be described. The processing of the eyeglass lens is performed by selecting various processing steps in accordance with the processing data of the target lens shape and the like input from the host computer 1000 or the display 5. In the description below, as the various processing steps, the rough-edging and the fine-edging are exemplified to be described.

Firstly, the eyeglass lens LE is conveyed from a conveying apparatus (not illustrated) to the eyeglass lens processing apparatus 1. A cup (not illustrated) is attached to the conveyed eyeglass lens LE by a cup attachment apparatus (not illustrated). The cup attachment apparatus attaches the cup so as to cause an optical center of the eyeglass lens and the center of the cup to align with each other. The conveying apparatus causes the eyeglass lens LE to be chucked between the lens chuck shafts 22F and 22R. The eyeglass lens LE to which the cup is attached is chucked between the lens chuck shafts 22F and 22R at a proper position with respect to the optical center. If the eyeglass lens LE is chucked therebetween, based on the processing data of the target lens shape and the like which is input in advance, the control portion 70 starts to process the eyeglass lens in each processing step. The cup attachment apparatus may attach the cup causing the center of the cup to align with a geometrical center of the target lens shape. The cup attachment apparatus is not limited to the present embodiment.

Subsequently, positions of the front surface of the eyeglass lens and the rear surface of the eyeglass lens are detected by the lens shape detection units 300F and 300R, thereby acquiring lens shape data. The detection information of the front surface and the rear surface of the lens detected by the lens shape detection units 300F and 300R is stored in the memory 3. The control portion 70 drives the motor 81 and causes the lens chuck unit 20 to retreat in the X-axis direction. Subsequently, the control portion 70 drives the motor 91 to move the spindle holding unit 30 in the Y-axis direction. In addition, when moving in the Y-axis direction, the control portion 70 drives the motor 26 to rotate the carriage 21 about the A-axis, thereby changing the shaft angle of the lens chuck shaft 22.

Figure 8A:
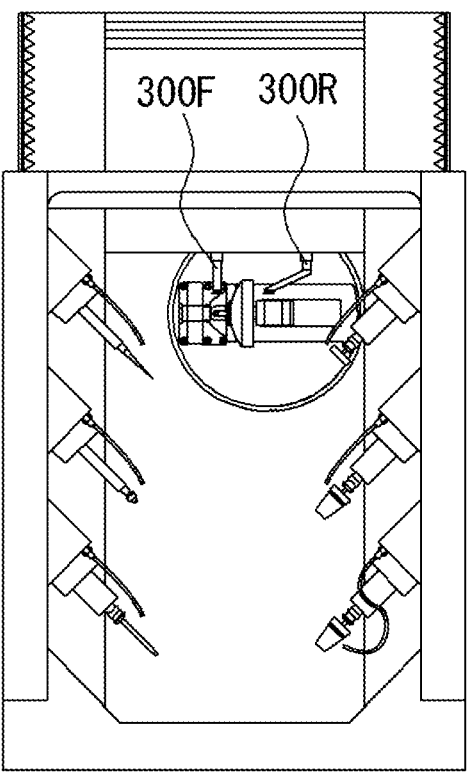
FIGS. 8A to 8C are views describing positional adjustments in Y-axis and Z-axis directions and positional relationships of a lens chuck shaft after adjustment.
Figure 8B:
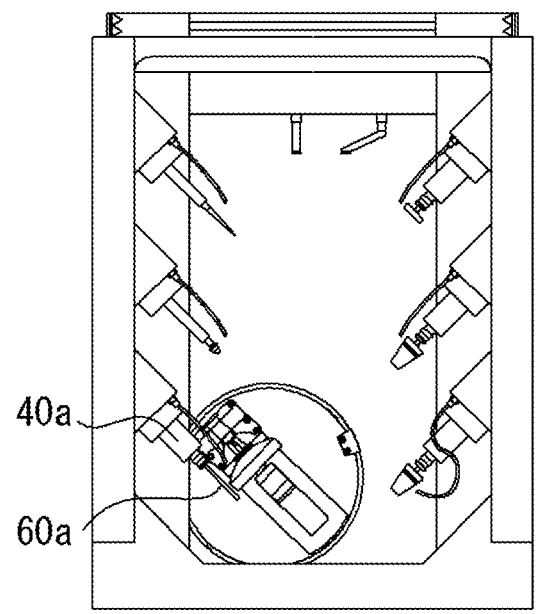
Figure 8C:
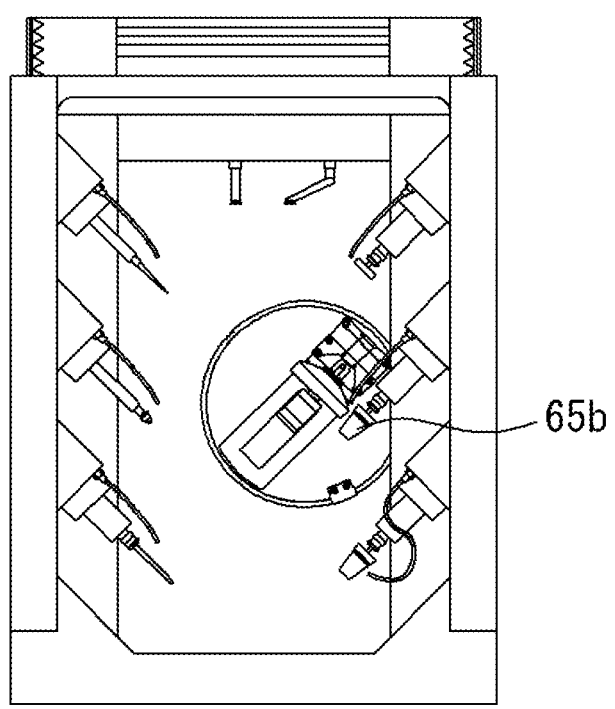

FIGS. 8A to 8C are views describing positional adjustments on a Y-Z plane and positional relationships of the lens chuck shaft 22 after adjustment. FIG. 8A illustrates a view when the detection is performed by the lens shape detection units 300F and 300R. FIG. 8B illustrates a view when the rough-edging is performed by the processing tool 60a. FIG. 8C illustrates a view when the fine-edging is performed by the fine-edging tool 65b.

The control portion 70 performs the positional adjustments in the Y-axis and Z-axis directions and adjustments of the shaft angle of the lens chuck shaft 22, thereby causing the eyeglass lens LE to be at the measurement position of the lens shape detection units 300F and 300R (refer to FIG. 8A). After the positional adjustments in the Y-axis and Z-axis directions and adjustments of the shaft angle of the lens chuck shaft 22, the control portion 70 drives the motor 81 to advance the lens chuck unit 20 in the X-axis direction. In this manner, the control portion 70 causes the eyeglass lens LE to be positioned at the measurement position of the lens shape detection units 300F and 300R. Then, the control portion 70 controls the rotational drive of the lens chuck shaft 22 and a drive of the movement support base 31 in the Y-axis direction based on the target lens shape, thereby acquiring the lens shape data of the front surface and the rear surface of the lens corresponding to the target lens shape in the lens chuck shaft direction.

<Acquisition of Lens Shape Data>

Figure 9A:
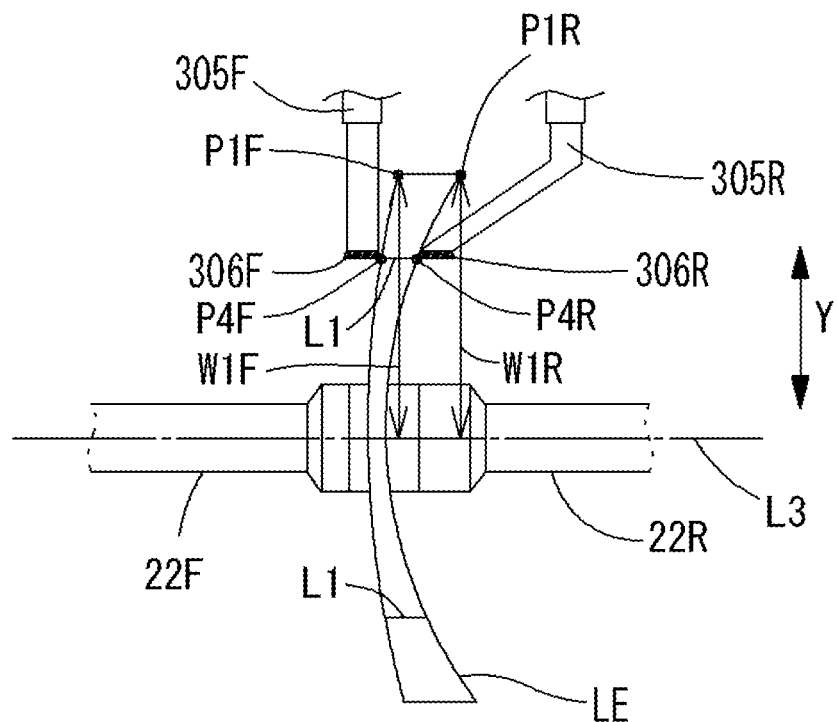
FIGS. 9A and 9B are views illustrating an eyeglass lens and a target lens shape.
Figure 9B:
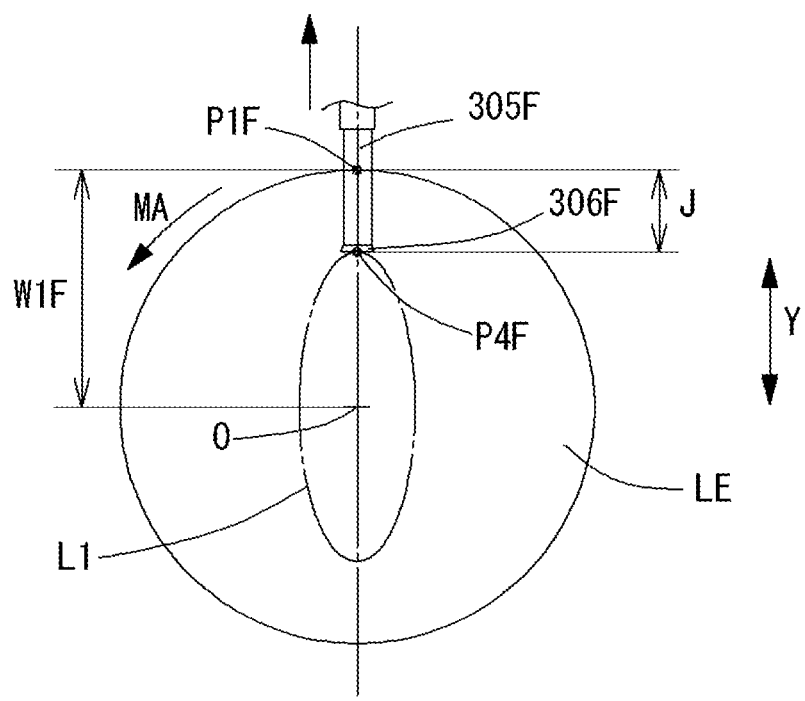

An acquisition operation of a lens shape will be described. FIGS. 9A and 9B are views illustrating the lens LE processed based on the target lens shape data, and a target lens shape L1. FIG. 9A is a view of the chucked eyeglass lens LE seen from a side surface direction, and FIG. 9B is a view of the eyeglass lens LE seen from the front. The eyeglass lens LE chucked between the lens chuck shafts 22F and 22R is disposed at a check position of the lens shape detection units 300F and 300R by rotating the carriage 21 and moving the movement support base 31 in the Y-axis direction.

If the eyeglass lens LE is disposed, the lens shape detection units 300F and 300R cause the tracing styli 306F and 306R to be respectively in contact with positions P4F and P4R corresponding to the target lens shape data of the eyeglass lens LE. Motors 316F and 316R (refer to FIG. 6) press the tracing styli 306F and 306R against the positions P4F and P4R of the eyeglass lens LE with a constant force. In this state, the spindle holding unit 30 is moved in the Y-axis direction so as to cause the tracing styli 306F and 306R to trace the target lens shape L1, thereby rotating the eyeglass lens LE in a MA-direction by 360 degrees. The tracing styli 306F and 306R trace the target lens shape from the positions P4F and P4R, and returns to the positions P4F and P4R again at the moment when the eyeglass lens LE is rotated by 360 degrees. The encoders 313F and 313R attached to the motors 316F and 316R measure the lens positions of the eyeglass lens LE corresponding to the target lens shape L1 in the direction of the lens chuck shafts 22F and 22R (Z-axis direction).

If the measurement of the lens positions corresponding to the target lens shape L1 ends, subsequently, a distance J from the position P4F (or P4R) to the set processing start position P1F (or P1R) is measured. The processing start position P1F (or P1R) denotes a position in which the processing tool comes into contact with the eyeglass lens LE for the first time when processing the eyeglass lens LE using the processing tool. In order to lessen the processing time, it is preferable that the processing start position P1F (or P1R) be set at a position (radius vector angle) of which the distance from the position P4F (or P4R) to the edge is the shortest.

In order to measure the distance J, in a state where the tracing styli 306F and 306R of the lens shape detection units 300F and 300R are pressed against the lens LE, the spindle holding unit 30 is moved upward in the Y-axis direction. A contact point of the tracing styli 306F and 306R and the lens LE is moved in an upper direction (outer side direction of target lens shape) of the Y-axis from the positions P4F and P4R. In this case as well, the front surface position and the rear surface position of the lens LE are measured by the encoders 313F and 313R.

The tracing styli 306F and 306R are moved to the processing start position P1F of the end portion (edge) on the front surface of the lens LE and the processing start position P1R of the end portion (edge) on the rear surface, thereby being released from the state of being in contact with the eyeglass lens LE. In this case, the counter force from the lens LE which is balanced with biasing from the motors 316F and 316R is removed. For this reason, the tracing styli 306F and 306R are quickly moved in the Z-axis direction by the biasing from the motors 316F and 316R. Therefore, the positional information of the lens detected by the encoders 313F and 313R is quickly changed. In this case, the control portion 70 acquires the distance J from the movement distance in the Y-axis direction acquired by the encoder 93. Then, from the distance J and the radius of the target lens shape (in the present embodiment, distances from central shaft of chuck to processing start positions P4F and P4R), it is possible to respectively calculate distances W1F and W1R from the central shaft of the chuck (rotational shaft of lens) L3 to the position P1F and a position P2R in the Y-axis direction.

If the positional information of the lens detected by the encoders 313F and 313R is quickly changed, the control portion 70 stops the movement toward the spindle holding unit 30 in the Y-axis direction, thereby ending the measurement of the distances W1F and W1R.

Depending on the shape of the unprocessed eyeglass lens LE, the distance W1F and the distance W1R which are the distances from the position P1F and the position P1R to a central shaft L3 of the chuck are not always the same as each other, thereby recording individually. As the case where the distances W1F and W1R are not the same with each other, for example, a case where the diameter on the front surface and the diameter on the rear surface of the eyeglass lens LE do not match each other can be exemplified.

Subsequently, the control portion 70 performs various processing on the eyeglass lens LE using each processing tool. During the processing using each processing tool, the lens chuck shaft 22 is rotated by a predetermined angle so as to cause the front surface side of the eyeglass lens LE to face a base portion of each processing tool. Hereinafter, each process will be described.

<Rough-Edging>

Figure 10:
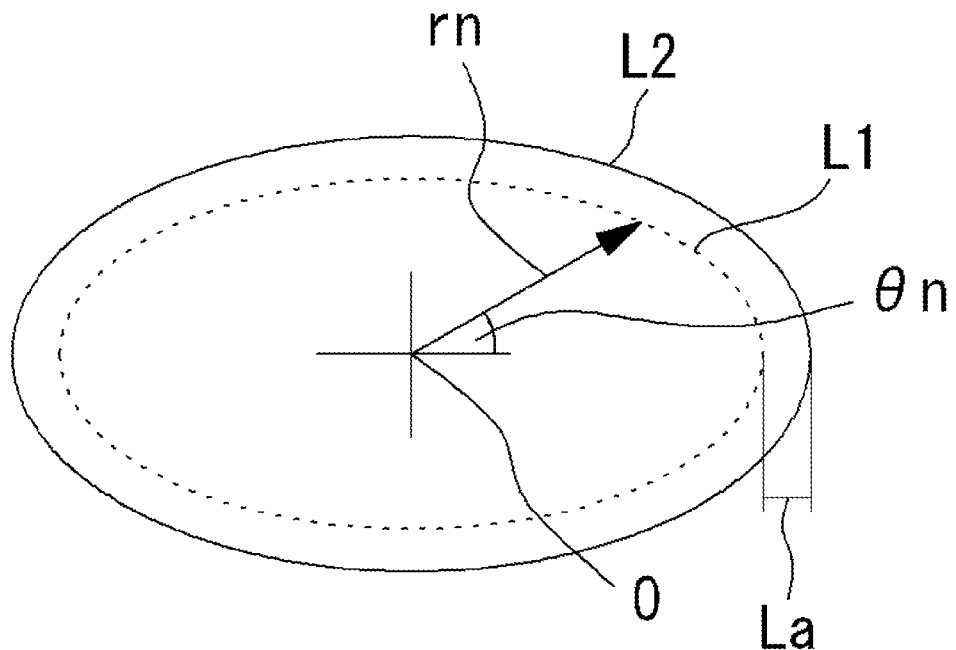
FIG. 10 is a view describing a processing path in rough-edging and fine-edging.

During the rough-edging, it is necessary to perform the cutting of the eyeglass lens LE in consideration of other processes after the rough-edging. FIG. 10 is a view describing the processing path in the rough-edging and the fine-edging. If the rough-edging is completed, the eyeglass lens is subject to the fine-edging by the processing tool 65b, and a final processing diameter of the eyeglass lens LE in the fine-edging is a fine-edging path L1 which is the input target lens shape. The target lens shape adopted as a standard of the rough-edging and the fine-edging of the lens LE is converted into radius vector (rn, θn) (n=1, 2, 3, and . . . N) based on a center (center of processing) O of the chuck of the lens chuck shaft 22. The reference sign rn denotes a radius vector length, and the reference sign en denotes a radius vector angle. The reference sign N is 1,000 points, for example.

A rough-edging path L2 is calculated based on the target lens shape (radius vector data) by the control portion 70 so as to obtain the processing diameter to which a lens margin allowed for finishing (portion subject to finishing) La in a uniform amount (for example, 1 mm) with respect to the fine-edging path L1 (target lens shape) in a normal direction is added. The radius vector data of the rough-edging path L2 is (Rn, θn) (n=1, 2, 3, and . . . N). Since the processing diameter during the rough-edging is also the radius vector Rn, the processing diameter is Rn, hereinafter.

Figure 11:
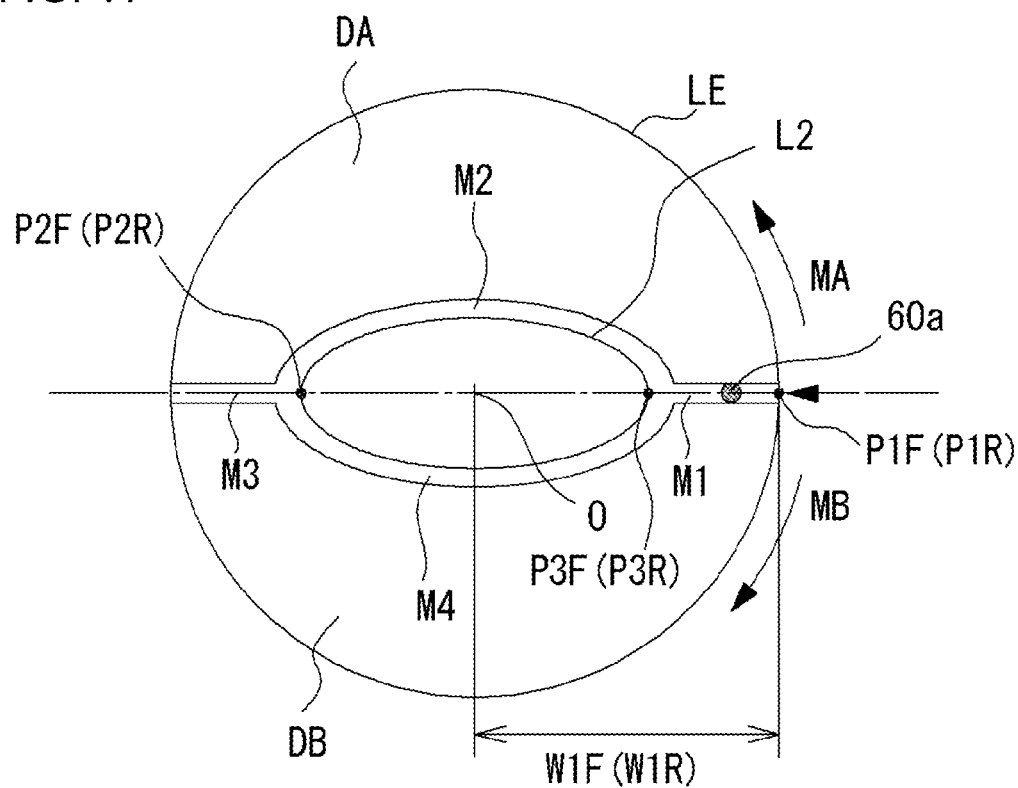
FIG. 11 is a view describing an example of a processing procedure during the rough-edging.

FIG. 11 is a view describing an example of the processing procedure during the rough-edging. For example, in the rough-edging, the cutting is performed twice (first cutting portion DA, second cutting portion DB) to cut the eyeglass lens LE. Naturally, a configuration may be employed in which the cutting is completed through a plurality of processes more than twice.

If the measurement of the lens LE by the lens shape detection unit 300 ends, the control portion 70 respectively moves the lens LE with respect to the processing tool 60a, thereby performing the processing. Accordingly, the control portion 70 moves the lens LE from the measurement position (position in FIG. 8A) of the lens shape detection unit 300 to the processing position (position in FIG. 8B) of the processing tool 60a.

In a case of the rough-edging performing the cutting twice, first, processing in the MA direction is performed. In order to perform the processing in the MA direction, the control portion 70 causes the processing tool 60a to be positioned at the position P1F (or position P1R) on the outer periphery of the lens. Thereafter, the cutting of the eyeglass lens LE starts from the position P1F (or position P1R), thereby performing the cutting in the order of routes M1, M2 (target lens shape portion) and M3. In this example, the route M3 is set in a direction opposite to the route M1 by 180 degrees with respect to the center O of the chuck. In the processing through the route M1, the control portion 70 relatively moves the lens LE until the processing tool 60a is oriented to the center O of the chuck and reaches the rough-edging path L2 in a state where the lens LE has stopped rotating. In the processing through the route M2, while rotating the lens LE (lens chuck shaft), the control portion 70 changes an approaching distance of the processing tool 60a with respect to the lens chuck shaft 22 based on the rough-edging path L2 obtained through the target lens shape L1 taken as the standard. If the processing tool 60a reaches a position P2F (or P2R) on the center O side of the chuck in the route M3, the control portion 70 stops the rotations of the lens LE and relatively moves the lens LE so as to cause the processing tool 60a to be withdrawn to the outer periphery of the lens LE along the route M3.

Accordingly, the first cutting portion DA is cut off from the lens LE which is held by the lens chuck shaft 22.

If the processing of the first cutting portion DA is completed, the processing of the second cutting portion DB starts. In the processing of the second cutting portion DB, the processing is performed so as to cause the processing tool 60a to pass through a route M4. In other words, the control portion 70 causes the processing tool 60a to pass through the route M3 from a position where the processing of the first cutting portion DA ends, thereby being positioned at the position P2F (or position P2R). Thereafter, while rotating the lens LE, the control portion 70 changes the approaching distance of the processing tool 60a with respect to the lens chuck shaft 22 based on the rough-edging path L2, thereby moving the processing tool 60a along the route M4. Accordingly, the second cutting portion DB is cut off from the lens LE which is held by the lens chuck shaft 22.

<Control of Rough-Edging>

Hereinafter, a specific processing control during the rough-edging will be described. During the rough-edging, the control portion 70 drives the motor 81 and causes the lens chuck unit 20 which is at the measurement position (position in FIG. 8A) of the lens shape detection unit 300 where the lens LE is measured to retreat in the X-axis direction. Then, the control portion 70 moves the lens LE from the measurement position of the lens shape detection unit 300 to the position (position in FIG. 8B) of the processing tool 60a to perform the rough-edging. In this case, the control portion 70 controls driving of the Y-axis drive mechanism 90 and the Z-axis drive mechanism 85 so as to cause the processing start position P1F (or position P1R) of the lens LE to come to a position where processing can be performed by the processing tool 60a, thereby adjusting the position in the Y-axis and Z-axis directions. While moving the lens LE from the measurement position of the lens shape detection unit 300 to the position where the processing can be performed by the processing tool 60a, the control portion 70 relatively moves the lens LE with respect to the processing tool 60a at a first relative speed. The first relative speed may be set to be faster than a relative speed (second relative speed) between the processing tool 60a and the eyeglass lens LE during the processing. The eyeglass lens LE is moved at high speed to the processing start position P1F (or P1R) at the first relative speed with respect to the processing tool 60a, and thus, it is possible to lessen the overall time taken for processing the lens LE.

While detecting angles and positions of the lens chuck shafts 22F and 22R and the processing tool 60a by the encoder attached to each motor, the control portion 70 causes the position P1F (or position P1R) of the eyeglass lens LE to be relatively close to the processing tool 60a.

In addition, based on the front surface positional information and the rear surface positional information of the eyeglass lens which are acquired through the lens shape measurement and stored in the memory 3, and the processing diameter Rn which is radius vector information for the rough-edging, the control portion 70 sets the shaft angle for each radius vector angle. Then, based on the set shaft angle, the control portion 70 controls the driving of the shaft angle change mechanism 25, thereby adjusting the shaft angle of the lens chuck shaft 22.

If the distance between the central shaft L3 of the chuck and the processing tool 60a reaches the distance W1F (or distance W1R), the control portion 70 rotates the rotational shaft 40a1 of the spindle 40a. Simultaneously, the relative speed of the eyeglass lens LE with respect to the processing tool 60a is switched from the first relative speed to the second relative speed that is a speed for the processing, thereby starting the processing of the eyeglass lens LE at the position P1F (or position P1R).

Based on the rough-edging path, the control portion 70 controls the driving of the Y-axis drive mechanism 90 and the Z-axis drive mechanism 85 so as to cause the processing tool 60a to move through the route illustrated in FIG. 11. In a cutting stage (routes M2, M4) along the rough-edging path, based on the front surface positional information and the rear surface positional information of the eyeglass lens which are acquired through the lens shape measurement and stored in the memory 3, and the processing diameter Rn which is the radius vector information for the rough-edging, the control portion 70 sets the shaft angle for each radius vector angle. Then, based on the set shaft angle in the lens LE, the control portion 70 controls the driving of the shaft angle change mechanism 25, thereby changing the shaft angle of the lens chuck shaft 22.

As described above, according to the present embodiment, based on the lens shape measurement result (distance J) of the lens shape detection units 300F and 300R, the distance W1F (or W1R) from the central shaft L3 of the chuck to the processing start position P1F (or P1R) of the eyeglass lens LE is calculated. The position is controlled in which the relative speed of the eyeglass lens LE with respect to the processing tool 60a is switched based on the calculated result thereof. Accordingly, it is possible to move the eyeglass lens LE and the processing tool 60a to a position where both are in a state immediately before coming into contact with each other at the first relative speed. Therefore, both are no longer moved at the second relative speed (processing speed) unnecessarily, and thus, it is possible to lessen the overall time for the processing of the lens LE.

In addition, as described above, the eyeglass lens processing apparatus according to the present embodiment controls the relative speed when shortening the relative distance between the eyeglass lens and each processing tool based on the lens shape detection units 300F and 300R. This includes a case where the eyeglass lens is relatively moved with respect to the processing tool and a position of the eyeglass lens is determined at a position where the processing tool can process the eyeglass lens.

Both of the distances W1F and W1R may not be required to be measured as long as at least one of the distances W1F and W1R is measured. It is preferable to measure both or the greater distance between the distances W1F and W1R. It is desirable to perform switching control of the relative speed based on the greater distance between the distances W1F and W1R. If the relative speed is controlled based on the greater distance, it is possible to prevent the processing tool 60a and the eyeglass lens LE from colliding with each other at the first relative speed.

In addition, according to the present embodiment, the distance J which is the shortest distance from a lens position of a certain point (for example, position P4F or P4R) in the target lens shape to the edge position (for example, P1F or P1R) is measured by the lens shape detection units 300F and 300R. Then, the processing starts from the edge position thereof (for example, P1F or P1R), thereby processing along the path in which the distance J is measured. For example, the processing is linearly performed from the position P1F (or P1R) to the position P4F (or P4R). In other words, the distance J from the target lens shape to the edge in an insertion direction of the processing tool 60a is measured. Accordingly, there is no need to calculate the edge position which is not measured, and thus, it is possible to perform the switching control of the relative speed through easy calculation.

In the processing of the second cutting portion DB, the processing may be configured to start from the position P3F (or position P3R) on the route M1 side as the processing start position, thereby performing the cutting so as to cause the rough-edging tool to pass through the route M4. In this case, similar to the cutting of the first cutting portion DA, the relative speed when causing the processing tool 60a and the eyeglass lens LE to be close to each other may be controlled based on the distance W1F (or distance W1R).

In addition, the processing may be configured to start the cutting from the second cutting portion DB instead of being configured to start the cutting from the first cutting portion DA.

In addition, according to the present embodiment, when starting the processing of the second cutting portion DB, similar to the processing of the first cutting portion DA, the relative speed of causing the eyeglass lens LE and the processing tool 60a to be close to each other may be controlled. In other words, a distance from the position P2F (P2R) on the rough-edging path L2 to the edge of the unprocessed eyeglass lens is measured, and thus, the relative speed of causing the eyeglass lens and the processing tool 60a to be close to each other may be controlled based on the distance thereof.

In the processing of the second cutting portion DB, the processing may be configured to start from the position P3F (or position P3R) on the route M1 side as the processing start position, thereby performing the cutting so as to cause the rough-edging tool to pass through the route M4. In addition, the processing may be configured to start the cutting from the second cutting portion DB instead of being configured to start the cutting from the first cutting portion DA.

A measurement method of the distance J is not limited to the method of the present embodiment. According to the present embodiment, the distance J is measured only once, but the embodiment is not limited thereto. For example, the distance J may be measured from the lens positions at multiple points corresponding to the target lens shape to the edge positions respectively corresponding thereto. In this case, any edge position corresponding to the measured lens positions at multiple points may be set as the processing start position.

In addition, according to the present embodiment, the lens shape detection units 300F and 300R are adopted to measure the distances W1F and W1R, but the embodiment is not limited thereto. For example, the distances W1F and W1R may be obtained through an image analysis from a lens image in which the eyeglass lens is imaged.

In addition, according to the present embodiment, the shortest distance (distance J) from a certain position P4F (or P4R) on the target lens shape to the edge is measured, but the embodiment is not limited thereto. The distance J from a position on the target lens shape (for example, positions P4F, P4R) to an arbitrary edge position may be measured. In this case, a positional relationship between the position where the measurement of the distance J starts and an arbitrary edge position may be stored in the memory 3 and the like.

In addition, the distance from a certain position (P4F or P4R) on the target lens shape to the edge is measured, but the embodiment is not limited thereto. The distance from the vicinity of the target lens shape to the vicinity of the edge position may be measured.

In addition, according to the present embodiment, the distance J from the target lens shape to the edge position is measured, but the embodiment is not limited thereto. An edge of the lens LE may be detected using a sensor to obtain the distance (W1F, W1R) from the central shaft L3 of the chuck to the edge.

In addition, the distance J may be measured by the lens shape detection units 300F and 300R to measure an outer diameter of the eyeglass lens LE based on the measurement result of the distance J and deviation information between the optical center of the lens LE and the geometrical center of the target lens shape. In this case, even if the eyeglass lens LE is processed from an arbitrary position on the outer periphery, it is possible to move the eyeglass lens LE and the processing tool 60a to the position where both are in a state immediately before coming into contact with each other at the first relative speed.

In addition, a lens diameter may be received through an external communication, and the relative speed between the eyeglass lens LE and the processing tool 60a may be controlled based on the data thereof.

The relative speed may be switched to the second relative speed before the distance between the center O of the chuck and the processing tool 60a reaches the distance W1F (or distance W1R). For example, the relative speed may be switched from the first relative speed to the second relative speed when the distance between the central shaft L3 of the chuck and the processing tool 60a reaches a position 1 mm to the distance W1F (or distance W1R).

In other words, the expression "reaching the processing distance" does not denote that the distance between the central shaft L3 and the processing tool 60a strictly matches the distance W1F, and the expression indicates that the lens LE and the processing tool 60a are close to but not in contact with each other.

In this manner, the relative speed may be switched with a margin from the distance W1F (or distance W1R). Accordingly, it is possible to reduce a possibility that the processing tool 60a may come into contact with the eyeglass lens LE at the first relative speed due to an occurrence of braking of the apparatus leading to damage to the eyeglass lens LE and the processing tool 60a.

In addition, as described above, without being limited to the cutting in which the processing tool 60a is adopted, the present embodiment can be applied to another processing tool. For example, in a case of grinding by the grindstone, it is possible to similarly switch the relative speed between the first relative speed and the second relative speed. In this case, similar to the present embodiment, it is possible to lessen the time taken for the overall processing.

During the rough-edging, if a speed of rotation of the processing tool 60a is set to or higher than 50,000 rpm (rotation per minute) to perform the processing, a cutting force is improved and the processing time is lessened, thereby being more preferable.

<Lens Shape Measurement after Rough-Edging>

If the rough-edging ends, the control portion 70 measures the lens shape again. Since there is a possibility that the lens LE may be deformed due to the rough-edging, it is more preferable for the fine-edging to adopt the lens shape data measured after the processing than to adopt the lens shape data before the processing.

The control portion 70 relatively moves the eyeglass lens LE with respect to the lens shape detection units 300F and 300R from the position when the rough-edging ends to the position to measure the lens shape. In this case, it is preferable that the eyeglass lens LE be moved at the first relative speed with respect to the lens shape detection units 300F and 300R. Accordingly, the overall time taken for the processing is lessened.

Figure 12A:
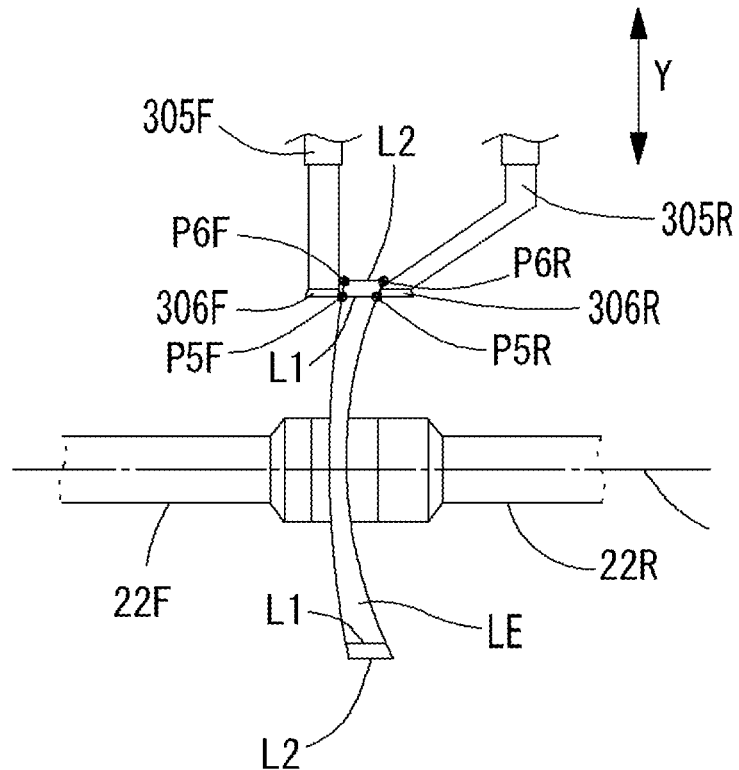
FIGS. 12A and 12B are schematic views illustrating the processed eyeglass lens.
Figure 12B:
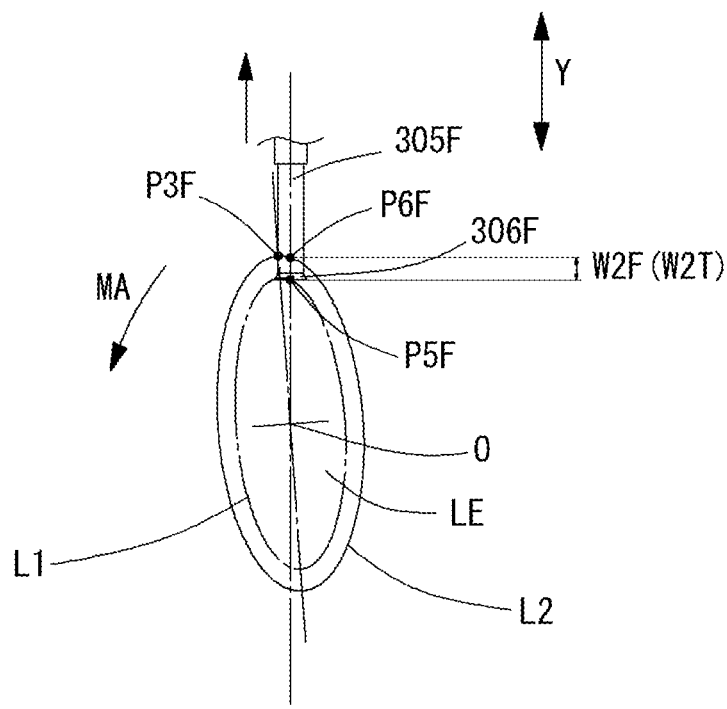

FIGS. 12A and 12B are schematic views illustrating the processed eyeglass lens LE. FIG. 12A is a view of the chucked eyeglass lens LE seen from the side surface direction, and FIG. 12B is a view of the eyeglass lens LE seen from the front surface. The control portion 70 causes the eyeglass lens LE to be disposed at a position to measure the lens shape. Then, the lens shape detection units 300F and 300R respectively press the tracing styli 306F and 306R against the positions P5F and P5R corresponding to the target lens shape L1 of the eyeglass lens LE with a predetermined force. According to the present example, the positions P5F and P5R are not present on the radius vectors of the positions P3F and P3R. The positions P5F and P5R are positions where a radius vector deviated from the positions P3F and P3R in a direction opposite to the processing direction MA and the target lens shape intersect with each other. The detailed description about the positions P5F and P5R will be given later.

The control portion 70 moves the spindle holding unit 30 in the Y-axis direction so as to cause the tracing styli 306F and 306R to trace the target lens shape L1 and rotates the lens LE by 360 degrees in the MA direction. The tracing styli 306F and 306R trace the target lens shape from the positions P5F and P5R and returns to the positions P5F and P5R again at the moment when the lens LE is rotated by 360 degrees. The encoders 313F and 313R attached to the motors 316F and 316R measure the positions of the lens LE corresponding to the target lens shape L1 in the direction of the lens chuck shafts 22F and 22R (Z-axis direction).

<Detection of Unprocessed Portion>

If the measurement of the lens positions corresponding to the target lens shape L1 ends, subsequently, the lens shape detection units 300F and 300R start to detect the unprocessed portion of the eyeglass lens LE from the positions P5F and P5R. The unprocessed portion denotes a remaining portion which is not processed after the processing of the eyeglass lens LE.

In order to detect the unprocessed portion, the control portion 70 according to the present embodiment moves the spindle holding unit 30 upward in the Y-axis direction in a state where the tracing styli 306F and 306R are respectively pressed against the positions P5F and P5R of the lens LE. A contact point between the lens LE and the tracing styli 306F and 306R moves in a radius direction of the target lens shape. At this moment, the encoders 313F and 313R still continue to measure the lens positions. According to the present embodiment, in order to detect the unprocessed portion of the lens LE, the control portion 70 measures the distances W2R and W2F from the positions (P5F, P5R) on the target lens shape to the edge of the lens LE in the radius direction of the target lens shape through the lens shape detection units 300F and 300R.

If the eyeglass lens is normally processed based on the processing conditions, the tracing styli 306F and 306R are moved to a position P6F of an end portion (edge) on the front surface of the lens LE after the rough-edging, and to a position P6R of an end portion (edge) on the rear surface. The positions P6F and P6R are positions on the rough-edging path L2. If the tracing styli 306F and 306R are moved to the positions P6F and P6R and deviated from a state of being in contact with the eyeglass lens LE, the positional information of the lens detected by the encoders 313F and 313R is quickly changed. The movement distance in the Y-axis direction at this moment is acquired from the encoder 93 (refer to FIG. 5), and thus, it is possible to detect the distance W2F of the target lens shape from the position P5F to the edge (position P6F) in the radius direction and the distance W2R of the target lens shape from the position P5R to the edge (position P6R) in the radius direction.

If the positional information of the lens detected by the encoders 313F and 313R is quickly changed, the control portion 70 stops the movement of the spindle holding unit 30 in the Y-axis direction, thereby ending the measurement of the distances W2F and W2R.

Both of the distances W2F and W2R may not be required to be measured as long as at least one of the distances W1F and W1R is measured.

In this manner, the lens shape detection units 300F and 300R check the eyeglass lens as the check units checking whether or not the eyeglass lens is properly processed.

<Detection of Malfunction in Processing Tool>

The control portion 70 determines a malfunction of the processing tool 60a through a measurement result of the distances W2F and W2R. As the malfunction, break, damage, a defect, deformation, a positional deviation and the like of the processing tool 60a can be exemplified. However, the malfunction of the processing tool is not limited thereto, indicating a state where the processing is not normally performed due to various reasons. The control portion 70 functions as the determination unit that determines whether or not there is a malfunction in the processing tool based on the measurement result of the check unit (for example, the lens shape detection units 300F and 300R).

Figure 13:
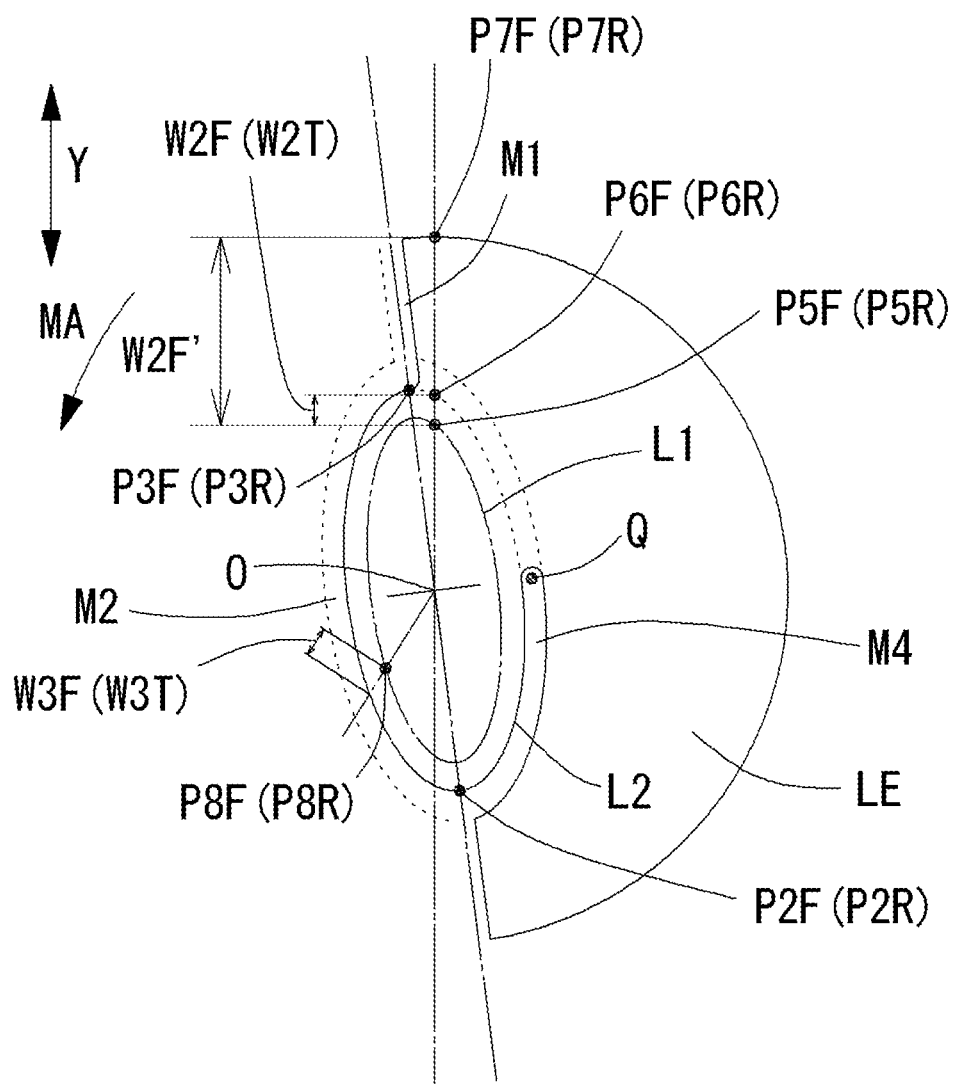
FIG. 13 is a view illustrating a state of a front surface of the eyeglass lens when processing is not normally performed.

FIG. 13 illustrates a state of a front surface of the eyeglass lens LE when the processing tool 60a is bent during the rough-edging and processing is not normally performed. The front surface of the eyeglass lens LE is described. However, the rear surface can be similarly described, and thereby description thereof is omitted. If the processing tool 60a is bent at a point Q of the route M4 through which the second cutting portion DB is processed, when the rough-edging ends, the second cutting portion DB is not ablated remaining in the eyeglass lens LE. In this case, if the above-described distance measurement is performed at the position P5F, the lens shape detection unit 300F measures the distance W2F' to a position P7F of the edge on the second cutting portion. Therefore, in a case where the processing is normally performed, if the distance W2F is set to a distance W2T, the distance W2F' is different from the distance W2T.

The distance W2T, in a case where there is no malfunction in the processing tool and the eyeglass lens LE is normally processed, can be calculated from the rough-edging path L2 which is set as the target lens shape data. In a case where the distance W2T calculated from the rough-edging path L2 which is set as the target lens shape data is different from the actual distance W2F (or W2F') which is obtained through the measurement, the control portion 70 determines that there is a malfunction in the processing tool 60a or the processing unit 40. In addition, at this moment, the control portion 70 notifies an operator of the occurrence of the malfunction in the processing tool 60a or the processing unit 40 through notification means. For example, the occurrence of the malfunction in the processing tool 60a may be displayed on the display 5 to notify the operator. In addition, a light source (not illustrated) may be flashed to notify the operator.

The measurement start position P5F where the measurement of the distance W2F from the position on the target lens shape to the edge of the lens LE starts will be described. It is preferable that the measurement of the distance W2F be performed at the position P5F where the processing tool 60a passes through at least latter half of the rough-edging. For example, during the processing, it is assumed that the processing tool 60a passes through the position P3F, performs the processing in the MA direction, and cuts the first cutting portion (refer to FIG. 11). Thereafter, it is assumed that the processing tool 60a is bent at the position Q in the midst of the processing of the second cutting portion DB. After the rough-edging ends, first, the lens position corresponding to the target lens shape after the rough-edging is measured by the lens shape detection units 300F and 300R. Subsequently, the distance W2F is measured, but the detection result differs depending on where the measurement position is set.

For example, a portion which is processed by the processing tool 60a passing through the route M2 is measured. For example, a distance W3F of the target lens shape in the radius direction from a position P8F corresponding to the target lens shape to the edge is measured. In this case, since the first cutting portion DA is ablated, the measured distance W3F matches the distance W3T calculated from the rough-edging path L2 that is set as the target lens shape data. Therefore, the control portion 70 proceeds to a step of fine-edging without detecting that the processing tool is bent on the route M4 and the second cutting portion DB remains without being processed. In this case, when performing the rough-edging for another lens LE, a malfunction in the processing tool 60a is detected.

Therefore, it is preferable that the position P5F where the measurement of the distance (distance W2F) from the target lens shape to the edge starts be a position where a portion processed by the processing tool 60a immediately before the completion of the processing can be measured. For example, with reference to FIG. 11, it is assumed that the processing tool 60a is moved from the processing start position P1F to the position P3F. In this state, a portion which remains without being cut, that is, a position slightly deviated in a direction MB opposite to the proceeding direction MA of the processing tool from the position P3F may be measured.

In this manner, the processing tool 60a starts to process the eyeglass lens LE, it is possible to detect the occurrence of the malfunction in the processing tool 60a immediately before the eyeglass lens LE substantially turns to complete the processing. Therefore, it is preferable to measure the distance (distance W2F) from the target lens shape to the edge at a processing position in the final stage as late as possible.

Figure 14:
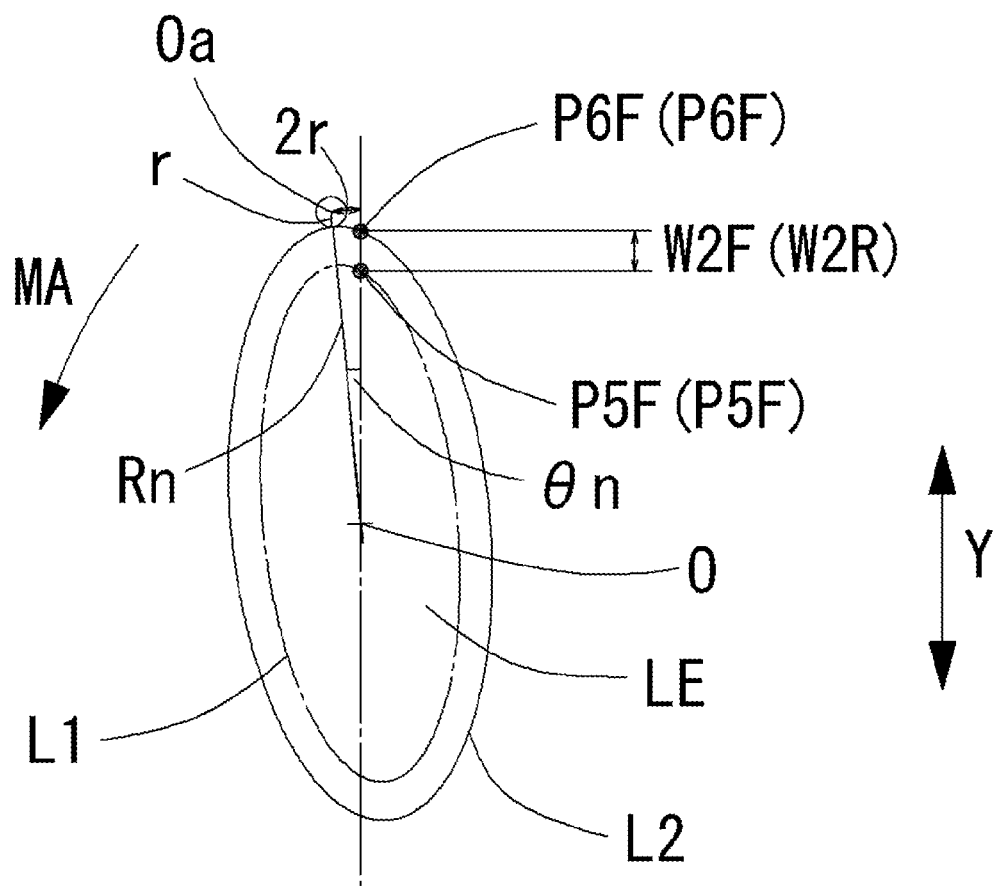
FIG. 14 is a view to describe a calculation method of a measurement start position.

In addition, for example, the measurement start positions P5F and P5R of the distances W2F and W2R may be calculated with a diameter of the processing tool 60a and a processing diameter Rn. FIG. 14 is a view to describe a calculation method of the measurement start position of the distances W2F and W2R. For example, it is assumed that the processing tool 60a abuts on the position P3F. In this case, a position deviated in the MB direction as twice (diameter 2r) as a radius r of the processing tool from a center Oa in a cross-sectional shape of the processing tool 60a is measured. If the direction deviates as much as the diameter 2r is assumed to be a direction perpendicular to the processing diameter Rn, a radius vector angle θn can be shown as the following expression.

$$\theta_n = \tan^{-1}\left(\frac{2r}{Rn+r}\right) \quad \text{[Expression 1]}$$

According to the radius vector angle θn obtained through the above calculation, it is possible to set the measurement start positions P5F and P5R on the target lens shape. In this manner, the measurement start positions P5F and P5R of the distances W2F and W2R from the target lens shape to the edge are obtained through the calculation, and thus, it is possible to start the measurement of the distances W2F and W2R at a preferable position even if the size of the target lens shape or the diameter of the processing tool 60a varies.

Without being limited to the above calculation, it is possible to calculate the measurement position of the distances W2F and W2R using the processing diameter Rn and the diameter (radius r, diameter 2r and the like) of the processing tool 60a variously. For example, the radius vector angle θn can be calculated through the following expression.

$$\theta_n = \sin^{-1}\left(\frac{2r}{Rn+1}\right) \quad \text{[Expression 2]}$$

In addition, if a surplus distance (for example, 5 mm) is set to α, the radius vector angle θn can be shown as the following expression.

$$\theta_n = \tan^{-1}\left(\frac{r+\alpha}{Rn+r}\right) \quad \text{[Expression 3]}$$

In the above description, if the lens shape measurement after the rough-edging ends, the measurement of the distances W2R and W2F is subsequently performed from a measurement end position (measurement start position), but the measurement is not limited thereto. Measurement may be performed separately from the lens shape measurement, and the measurement may be performed before the lens shape measurement. In addition, the distances W2F and W2R may be measured from another position corresponding to the target lens shape instead of the measurement end position (measurement start position).

In a case where the distance W2F (or W2R) is less than the lens margin allowed for finishing La which is set in advance, the control portion 70 may determine that there is a malfunction in the processing tool or the processing unit.

It is not necessary to strictly measure the distances W2F and W2R, and the measurement start position is not necessarily a position corresponding to the target lens shape. Presence or absence of a malfunction in the processing tool 60a can be determined by detecting whether or not there is an unprocessed portion on an outer side of the rough-edging path L2. According to the present embodiment, the measurement starts from the measurement positions P5F and P5R corresponding to the target lens shape, and thus, the measurement may not be performed until the positional information detected by the encoders 316F and 316R quickly changes.

According to the present embodiment, in order to detect the unprocessed portion in the eyeglass lens LE, the distances W2F and W2R from the target lens shape to the edge are detected, but the embodiment is not limited thereto. For example, if the measurement of the lens position corresponding to the target lens shape ends, the lens shape detection units 300F and 300R may detect the lens shape from slightly inward the rough-edging path L2 to slightly (to the extent of radius r of processing tool 60a) outward the rough-edging path L2. In addition, for example, the lens shape detection units 300F and 300R may measure a region (for example, outward from rough-edging path L2 by 1 mm) away from the chuck shaft 22 of the lens chuck unit rather than the rough-edging path L2, thereby detecting whether there is an unprocessed portion.

In this manner, as long as the method detects whether or not there is an unprocessed portion on the outer side of the processing path, it is possible to detect a malfunction in the processing tool or the processing unit in not only the rough-edging in which the lens margin allowed for finishing La remains but also in another processing method in which the lens margin allowed for finishing La does not remain.

According to the present embodiment, the distances W2R and W2F from the distances P5F and P5R on the target lens shape to the edge of the lens LE are measured by the lens shape detection units 300F and 300R in the radius direction of the target lens shape, the embodiment is not limited thereto. For example, the shortest distance from the target lens shape to the edge may be measured. In this case, the tracing styli 306F and 306R are moved in the normal direction of the target lens shape with respect to the lens LE.

In addition, according to the present embodiment, the detection of the unprocessed portion is measured after completing the rough-edging, but the embodiment is not limited thereto. For example, the detection of the unprocessed portion may be performed at a position where the first cutting portion DA is processed, after the processing of the first cutting portion DA ends, and in the midst of the processing of the second cutting portion DB.

The measurement positions P5F and P5R measuring the lens shape after the rough-edging may not be on the target lens shape. A position slightly deviated from the target lens shape in a direction toward the edge may be measured.

The distances W2F and W2R from the target lens shape to the edge may be measured at multiple places. If the measurement is performed at multiple places, erroneous determination is reduced.

In addition, after measuring the distances W2F and W2R from the target lens shape to the edge, if the distance W2F (or W2R) is detected to be greater than the distance W2T which is calculated from the target lens shape data and the set rough-edging path L2, it is possible to detect how far the rough-edging is performed. For example, the lens shape detection units 300F and 300R detect the route through which the processing tool 60a having the diameter 2r passes by tracing a direction (direction MB) opposite to the processing direction. In other words, the route M4 and the route M2 are detected in the MB direction.

If the checking is performed tracing the route M4 and the route M2 in the direction MB, the tracing styli 306F and 306R are deviated from the eyeglass lens LE in a portion processed before the processing tool 60a is bent, and thus, the positional information detected by the encoders 306F and 306R quickly change in a portion processed before the processing tool 60a is bent. The rotational angle is detected by the encoder 79, thereby detecting the position Q (refer to FIG. 13) processed before the processing tool 60a is bent.

Accordingly, when starting the rough-edging again by replacing the processing tool 60a, it is possible to move the eyeglass lens LE to the position Q with respect to the processing tool 60a at the first relative speed.

In addition, by acquiring the radius vector length of the processed eyeglass lens LE through radius vector length acquisition means (not illustrated) and comparing the acquisition result thereof and radius vector length obtained from the rough-edging path L2, the control portion 70 may determine whether or not there is the occurrence of a malfunction in the processing tool or the processing unit. For example, the radius vector length acquisition means causes a sensor to abut on the edge of the eyeglass lens LE and moves the sensor along the outer periphery of the lens by 360 degrees, thereby acquiring the diameter of the lens.

According to the present embodiment, the unprocessed portion in the eyeglass lens LE is detected such that presence of a malfunction in the processing tool and the processing unit, or absence of a malfunction therein is detected, but the embodiment is not limited thereto.

For example, the processed portion (or processed region) of the eyeglass lens may be detected, thereby determining the presence or absence of a malfunction in the processing tool and the processing unit from the detection result thereof. The processed portion is an ablated (cut or ground) portion by the processing of the eyeglass lens LE.

In this case, for example, a weight of the ablated and fallen eyeglass lens LE is measured using a weighing device (not illustrated). A weight of the processed portion may be calculated from the target lens shape data, the set processing path, a material of the eyeglass lens and the like, thereby determining that the processing of the eyeglass lens LE is not normally performed due to the malfunction of the processing tool when the weight of the processed portion measured by the weighing device is different from the calculation result.

In addition, for example, the eyeglass lens LE in the processed region may be detected using a sensor (not illustrated), thereby determining there is no malfunction in the processing tool when nothing is detected.

Figure 15:
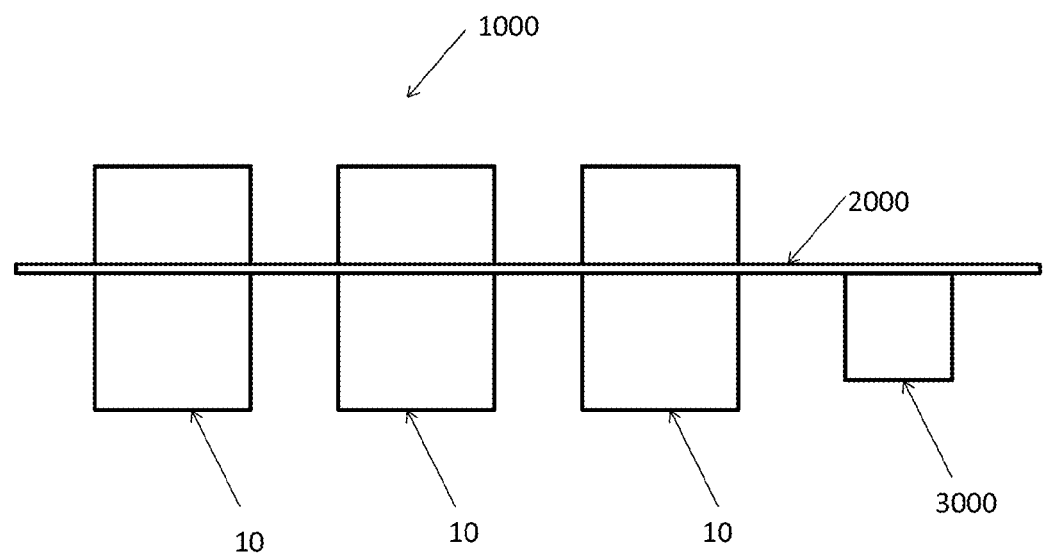
FIG. 15 is a schematic configuration view of am eyeglass lens processing system.

The check unit disclosed in the preset embodiment is useful in an eyeglass lens processing system 1000 including a plurality of the eyeglass lens processing apparatus which processes the eyeglass lens in large quantity (refer to JP-A-2012-183633 for detail). FIG. 15 is a schematic configuration view of the eyeglass lens processing system 1000. For example, the eyeglass lens processing system 1000 controls a conveyer 2000, conveys the eyeglass lens to the eyeglass lens processing apparatus 10 which are disposed in plural, and processes the eyeglass lens by each processing apparatus 10. In the eyeglass lens processing system, a conveyer controller 3000 which controls operations of the conveyer 2000 when conveying the eyeglass lens through the conveyer selects the eyeglass lens processing apparatus 10 to which the eyeglass lens is conveyed based on the check result by the check unit, thereby controlling conveying of the eyeglass lens. For example, the conveyer controller 2000 checks whether or not the eyeglass lens is properly processed using the check unit, and conveys new eyeglass lens to the eyeglass lens processing apparatus 10 from which a check result of properly processed eyeglass lens is obtained. In this manner, the check unit disclosed in the present embodiment is provided in the eyeglass lens processing system, and thus, it is possible for each eyeglass lens processing apparatus to perform a check through the check unit during the processing operation. For example, each eyeglass lens processing apparatus can perform the eyeglass lens shape measurement and the check by the check unit. Therefore, in the eyeglass lens processing system 1000, it is possible to smoothly perform the processing operation including the check, and thus, it is possible to process more eyeglass lenses. In addition, there is no need for the eyeglass lens processing system 1000 to separately provide a configuration to detect tools for each eyeglass lens processing apparatus, thereby leading to reduction in costs and a simplified apparatus.

<Fine-Edging>

If the measurement of the lens margin allowed for finishing ends, the control portion 70 performs the fine-edging. The control portion 70 drives the motor 81 and causes the lens chuck unit 20 to retreat in the X-axis direction. Similarly as described above, the control portion 70 performs the positional adjustment in the Y-axis and Z-axis directions and adjusts the shaft angle of the lens chuck shaft 22, thereby causing the eyeglass lens LE to come to a position of the processing tool 65b to perform the fine-edging (refer to FIG. 9C).

The control portion 70 causes the lens chuck shaft 22 to be parallel to a processing surface of a cone of a processing tool 65b. Otherwise, if the edge of the lens is tapered (tapered shape), the control portion 70 tilts the lens chuck shaft 22 to tilt in angle with respect to a processing surface of the cone in accordance with the tapered angle thereof, thereby performing the fine-edging.

For example, in a bevel-finishing, the control portion 70 controls the driving in the Y-axis direction and the Z-axis direction so as to cause a predetermined position of the lens edge after the rough-edging to be positioned in a bevel groove of the processing tool 65b based on the bevel path (obtained through predetermined calculation based on thickness of lens edge). In addition, the control portion 70 changes the shaft angle of the lens chuck shaft 22 having the A-axis as the rotational center so as to form a tilt at a predetermined angle or to form an angle perpendicular to a front surface curve of the eyeglass lens LE, thereby controlling the rotational driving of the shaft angle of the lens chuck shaft 22.

In addition, in the flat-finishing, the control portion 70 controls the driving in the Y-axis direction and the Z-axis direction based on the target lens shape so as to cause the lens edge after the rough-edging to be positioned on a flat-finishing surface of the processing tool. In addition, the control portion 70 changes the shaft angle of the lens chuck shaft 22 having the A-axis as the rotational center so as to form a tilt at a predetermined angle with respect to a flat-processing surface of the cone or to form an angle perpendicular to the front surface curve of the eyeglass lens LE, thereby controlling the rotational driving of the shaft angle of the lens chuck shaft 22.

If the eyeglass lens LE is positioned at the position of the processing tool 65b, the control portion 70 drives a drive source (not illustrated), causes the spindle 45b to be rotationally driven, and causes each processing tool to rotate about the same shaft. Then, the control portion 70 controls the driving of the shaft angle of the lens chuck shaft 22 in the Y-axis direction and the Z-axis direction based on the target lens shape, thereby performing the fine-edging.

According to the present example, the processing tool 65b also serves as a processing tool to perform the chamfer-finishing. In this case, a flat-finishing surface also serves as the chamfer-finishing surface. The control portion 70 controls the tilt angle of the lens chuck shaft 22 based on an angle of the chamfer-finishing. That is, the control portion 70 performs controlling in the Y-axis direction and the Z-axis direction based on a chamfer-finishing path (obtained through predetermined calculation based on front surface (front surface edge) position and rear surface (rear surface edge) position of lens), thereby performing the chamfer-finishing. In this case, the control portion 70 rotates the shaft angle of the lens chuck shaft 22 in a a-direction or a b-direction by 180 degrees, thereby switching the front surface and the rear surface of the eyeglass lens in which the processing is performed using the processing tool 65b. In this manner, the shaft angle of the lens chuck shaft 22 is changed, and thus, it is possible to perform the chamfer-finishing on the front surface and the rear surface of the eyeglass lens using one processing tool.

<Polishing>

If polishing is set, the control portion 70 performs the polishing. The control portion 70 drives the motor 81 and causes the lens chuck unit 20 to retreat in the X-axis direction. Similar to the above-described rough-edging and fine-edging, the control portion 70 performs the positional adjustment in the Y-axis and Z-axis directions and adjusts the shaft angle of the lens chuck shaft 22, thereby causing the eyeglass lens LE to come to a position of the processing tool 65a to perform the polishing.

The polishing is performed through the controlling similar to the above-described ordinary fine-edging. If the eyeglass lens LE is positioned to the position of the processing tool 65b, the control portion 70 drives a drive source (not illustrated), causes the spindle 45b to be rotationally driven, and causes each processing tool to rotate about the same shaft. Then, the control portion 70 controls the driving of the shaft angle of the lens chuck shaft 22 in the Y-axis direction and the Z-axis direction based on the target lens shape, thereby performing the polishing. During the polishing, water is used.

<Other Processing>

In other processing, similarly as described above, the positional adjustment is performed in the Y-axis and Z-axis directions and the shaft angle of the lens chuck shaft 22 is adjusted so as to cause the eyeglass lens LE to come to a position of each processing tool.

For example, in groove-finishing, after the flat-finishing, the control portion 70 uses the processing tool 60b to control the driving in the Y-axis direction and the Z-axis direction based on a groove-finishing path (obtained through predetermined calculation based on thickness of lens edge), thereby performing the processing.

For example, in boring, the control portion 70 causes the front surface of the lens to face in the tip end direction of a processing tool 60c. The control portion 70 tilts the lens chuck shaft and controls the driving in the Y-axis direction and the Z-axis direction so as to cause the shaft of the boring tool to face in the normal direction at a bore position based on input positional data of the bore and the front surface shape of the lens (obtained through lens shape measurement) at the bore position, thereby performing the processing.

For example, in the stepped-edging, the control portion 70 causes the lens chuck shaft 22 to tilt based on a tilt of a processing tool 65c. Then, the control portion 70 controls the driving in the Y-axis direction and the Z-axis direction based on the bevel path and the input stepped-edging path (path of position at corner on L-shape), thereby performing the processing.

When measuring or processing the eyeglass lens LE, for example, the eyeglass lens LE may be relatively moved with respect to the processing tool 60a, or the processing tool 60a may be respectively moved with respect to the eyeglass lens LE. The processing apparatus according to the present embodiment may be provided with a configuration in which the relative distance between the eyeglass lens and each processing tool is adjusted based on the processing data.

In addition, according to the present embodiment, when measuring the lens position corresponding to the target lens shape, the eyeglass lens is rotated by 360 degrees, but the embodiment is not limited thereto. The lens LE may be rotated more than once so as to measure the lens shape for multiple times. In this case, a different position on the eyeglass lens LE may be measured.

According to the present embodiment, the control portion 70 functions as a calculator which performs various calculations. In addition, the control portion 70 also functions as speed switching means for switching the relative speed of the eyeglass lens LE with respect to the processing tool between the first relative speed and the second relative speed.

3 memory
5 display
7 switch portion
21 rotational base (carriage)
22F, 22R lens chuck shaft
25 shaft angle change means
40 first processing unit
40a spindle portion
40a1 processing tool rotational shaft
45 second processing unit
300F, 300R lens shape detection unit
60a rough-edging tool
70 control portion
80 X-axis drive mechanism
85 Z-axis drive mechanism
90 Y-axis drive mechanism

What is claimed is:

1. An eyeglass lens processing apparatus configured to process an eyeglass lens based on processing data, comprising:
   a lens chuck unit configured to hold the eyeglass lens;
   a processing unit including an edging tool configured to edge the eyeglass lens held by the lens chuck unit;
   an adjustment unit configured to adjust a relative distance between the eyeglass lens and the edging tool;
   a processor; and
   memory storing computer readable instructions, when executed by the processor, causing the eyeglass lens processing apparatus to function as:

a check unit configured to check whether or not the eyeglass lens is properly processed in a state where the eyeglass lens is held by the lens chuck unit.

2. The eyeglass lens processing apparatus according to claim 1, wherein the computer readable instructions when executed by the processor causes the eyeglass lens processing apparatus to function as:

a determination unit configured to determine whether or not there is a malfunction in the processing unit based on a check result of the check unit.

3. The eyeglass lens processing apparatus according to claim 2, wherein the eyeglass lens processing apparatus is configured to process a rim of the eyeglass lens by operating the processing unit, wherein the check unit checks for the presence or absence of an unprocessed portion of the eyeglass lens in a region further away from a chuck shaft of the lens chuck unit than a processing path along which the rim of the eyeglass lens is to be processed based on the processing data, and wherein the determination unit determines that there is a malfunction in the processing unit if the unprocessed portion is present.

4. The eyeglass lens processing apparatus according to claim 1, wherein the check unit checks for the presence or absence of the unprocessed portion of the eyeglass lens only at one radius vector angle.

5. The eyeglass lens processing apparatus according to claim 1, wherein the check unit checks for the presence or absence of the unprocessed portion of the eyeglass lens at a plurality of radius vector angles.

6. The eyeglass lens processing apparatus according to claim 1, wherein the check unit calculates a check position of the eyeglass lens related to the radius vector angle based on the processing data.

7. The eyeglass lens processing apparatus according to claim 1, wherein the eyeglass lens processing apparatus processes a whole circumference of the rim of the eyeglass lens by relatively moving at least one of the edging tool and the eyeglass lens along a processing path based on the processing data, and wherein the check unit determines at least one check position based on a radius vector angle at a beginning of processing or an end of the processing in the processing path and checks for the presence or absence of the unprocessed portion at the determined check position.

8. The eyeglass lens processing apparatus according to claim 3, wherein the eyeglass lens processing apparatus can process the rim of the eyeglass lens over 360 degrees in the whole circumference by at least any one of rotations of the lens chuck unit and movements of the edging tool, and wherein the check unit acquires at least one of the radius vector angles of the eyeglass lens which is processed after the half of the circumference passes through based on the processing data and checks for the presence or absence of the unprocessed portion of the eyeglass lens at the acquired radius vector angle.

9. The eyeglass lens processing apparatus according to claim 1, wherein the eyeglass lens processing apparatus processes the whole circumference of the rim of the eyeglass lens by relatively moving at least one of the edging tool and the eyeglass lens along the processing path, and wherein the check unit determines the check position in the latter half of the circumference from the beginning of the processing or the end of the processing in the processing path.

10. The eyeglass lens processing apparatus according to claim 1, wherein the check unit includes a calculator configured to calculate the check position of the eyeglass lens in a circumferential direction based on a diameter of the edging tool and a radius vector length of a target lens shape.

11. The eyeglass lens processing apparatus according to claim 1, wherein the check unit includes a positional information measurement unit configured to measure at least one of front surface positional information and rear surface positional information of the eyeglass lens corresponding to target lens shape data, wherein the check unit checks whether or not the eyeglass lens is properly processed based on a measurement result related to at least one of the front surface positional information and the rear surface positional information of the eyeglass lens.

12. The eyeglass lens processing apparatus according to claim 11, wherein after measuring at least one of the front surface positional information and the rear surface positional information of the eyeglass lens corresponding to the target lens shape data, the check unit sequentially checks whether or not the eyeglass lens is properly processed.

13. The eyeglass lens processing apparatus according to claim 11, wherein after measuring at least one of the front surface positional information and the rear surface positional information of the eyeglass lens corresponding to the target lens shape data in a chuck shaft direction of the lens chuck unit is completed over 360 degrees in the whole circumference, the check unit checks whether or not the eyeglass lens is properly processed at least at a measurement completion position where the measuring is completed.

14. The eyeglass lens processing apparatus according to claim 2, further comprising:

a notification unit configured to notify an operator of a determination result determined by the determination unit.

15. The eyeglass lens processing apparatus according to claim 1 further comprising:

a target lens shape acquisition unit configured to acquire a target lens shape data of the eyeglass lens, wherein the check unit includes a radius vector length measurement unit configured to measure a radius vector length which is a diameter of the eyeglass lens held by the lens chuck unit, wherein the check unit determines that the eyeglass lens is not properly processed when the radius vector length of the processed eyeglass lens measured by the radius vector length measurement unit is different from a radius vector length estimated based on the target lens shape data.

16. An eyeglass lens processing system comprising:
a plurality of eyeglass lens processing apparatuses configured to process an eyeglass lens based on processing data, each of the plurality of eyeglass lens processing apparatuses comprising:
   a lens chuck unit configured to hold the eyeglass lens;
   a processing unit including an edging tool configured to edge the eyeglass lens held by the lens chuck unit;
   an adjustment unit configured to adjust a relative distance between the eyeglass lens and the edging tool;
   a processor; and
   memory storing computer readable instructions, when executed by the processor, causing the eyeglass lens processing apparatus to function as:
      a check unit configured to check whether or not the eyeglass lens is properly processed in a state where the eyeglass lens is held by the lens chuck unit,
a conveyer configured to convey the eyeglass lens to the plurality of eyeglass lens processing apparatus; and
a conveyer controller configured to control an operation of the conveyer, select one of the eyeglass lens processing apparatuses to which the eyeglass lens is conveyed based on a check result of the check unit, and controls conveying of the eyeglass lens.

* * * * *